US012433390B2

(12) United States Patent
Christensen et al.

(10) Patent No.: US 12,433,390 B2
(45) Date of Patent: *Oct. 7, 2025

(54) FRAME FOR AT LEAST ONE SCANNING DEVICE AND SPATIAL DETECTION DEVICE WITH AT LEAST ONE SCANNING DEVICE

(71) Applicant: NavVis GmbH, Munich (DE)

(72) Inventors: Nils Christensen, Munich (DE); Prashant Doshi, Munich (DE); Tim Habigt, Munich (DE); Michael Jaschke, Munich (DE); Mandolin Maidt, Munich (DE); Malte Pliszewski, Munich (DE); Georg Schroth, Munich (DE); Christian Werner, Munich (DE)

(73) Assignee: NavVis GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,004

(22) Filed: Jun. 13, 2024

(65) Prior Publication Data

US 2024/0324756 A1 Oct. 3, 2024

Related U.S. Application Data

(63) Continuation of application No. 17/631,307, filed as application No. PCT/EP2020/071289 on Jul. 28, 2020, now Pat. No. 12,011,081.

(30) Foreign Application Priority Data

Jul. 31, 2019 (DE) .................... 10 2019 120 702.9

(51) Int. Cl.
*A45F 3/10* (2006.01)
*F16M 13/04* (2006.01)
(Continued)

(52) U.S. Cl.
CPC .............. *A45F 3/10* (2013.01); *F16M 13/04* (2013.01); *G01C 15/002* (2013.01);
(Continued)

(58) Field of Classification Search
CPC ................. A45F 3/10; A45F 2003/003; A45F 2200/0533; G01S 17/86; G01S 7/4811;
(Continued)

(56) References Cited

U.S. PATENT DOCUMENTS

| 4,015,759 A | 4/1977 | Dreissigacker et al. |
| 4,037,763 A * | 7/1977 | Turchen ................. F16M 13/00 |
| | | 280/30 |

(Continued)

FOREIGN PATENT DOCUMENTS

| DE | 10 200 405 0682 A1 | 6/2005 |
| DE | 10 2011 121 115 A1 | 6/2012 |

(Continued)

OTHER PUBLICATIONS

Mariana Campos et al, "A Backpack-Mounted Omnidirectional Camera with Off-the-Shelf Navigation Sensors for Mobile Terrestrial Mapping: Development and Forest Application", Sensors, vol. 18, No. 3, Mar. 9, 2018 (18 pages).

(Continued)

*Primary Examiner* — Frantz B Jean
(74) *Attorney, Agent, or Firm* — Fleit Intellectual Property Law; Paul D. Bianco

(57) ABSTRACT

A frame for a scanning device includes a supporting device for fitting and carrying the frame by a person. The supporting device has a shoulder rest for placing the frame on the person's shoulders. The frame further includes an upper frame section, to which a first holder for the scanning device is fastened, with the first holder located above the person's head when the person is carrying the frame by means of the (Continued)

supporting device. The frame further has a contact part which is connected via a bracket to the shoulder rest, with the contact part located at the level of the person's hip region when the person is carrying the frame by means of the supporting device. A spatial detection device includes a scanning device and a frame.

17 Claims, 9 Drawing Sheets

(51) Int. Cl.
    *G01C 15/00*     (2006.01)
    *G01S 7/481*     (2006.01)
    *G01S 17/86*     (2020.01)
    *G01S 17/89*     (2020.01)
    *H04N 23/54*     (2023.01)
    *H04N 23/90*     (2023.01)
    *A45F 3/00*     (2006.01)
    *A45F 5/00*     (2006.01)

(52) U.S. Cl.
    CPC ............. *G01S 7/4811* (2013.01); *G01S 17/86* (2020.01); *G01S 17/89* (2013.01); *H04N 23/54* (2023.01); *H04N 23/90* (2023.01); *A45F 2003/003* (2013.01); *A45F 5/1533* (2025.01)

(58) Field of Classification Search
    CPC ........ G01S 17/89; H04N 23/54; H04N 23/90; F16M 13/04; G01C 15/002
    See application file for complete search history.

(56) References Cited

U.S. PATENT DOCUMENTS

| | | |
|---|---|---|
| 6,141,034 A | 10/2000 | McCutchen |
| 8,941,777 B1* | 1/2015 | Ratner ................ G03B 17/563 |
| | | 396/420 |
| 2012/0000948 A1 | 1/2012 | Maggi |
| 2017/0269215 A1 | 9/2017 | Hall et al. |

FOREIGN PATENT DOCUMENTS

| | | |
|---|---|---|
| EP | 2388615 A1 | 11/2011 |
| EP | 2913796 A1 | 9/2015 |
| EP | 3228985 A1 | 10/2017 |

OTHER PUBLICATIONS

Leica Pegasus: Backpack; Mobile reality capture, Mar. 31, 2017, retrieved from the internet http://www.noartechnologies.com/wp-content/uploads/2017/03/Leica_PegasusBackpack_en.pdf (2 pages).
George Vosselman, "Design of an Indoor Mapping System Using Three 2D Laser Scanners and 6DOF SLAM", ISPRS Technical Commission III Symposium, Sep. 7, 2014 (7 pages).
International Preliminary Report on Patentability dated Feb. 1, 2022, with Written Opinion, for International Application No. PCT/EP2020/071289, filed Jul. 28, 2020.
International Search Report dated Dec. 16, 2020 with Written Opinion for PCT/EP2020/071289, filed Jul. 28, 2020.

* cited by examiner

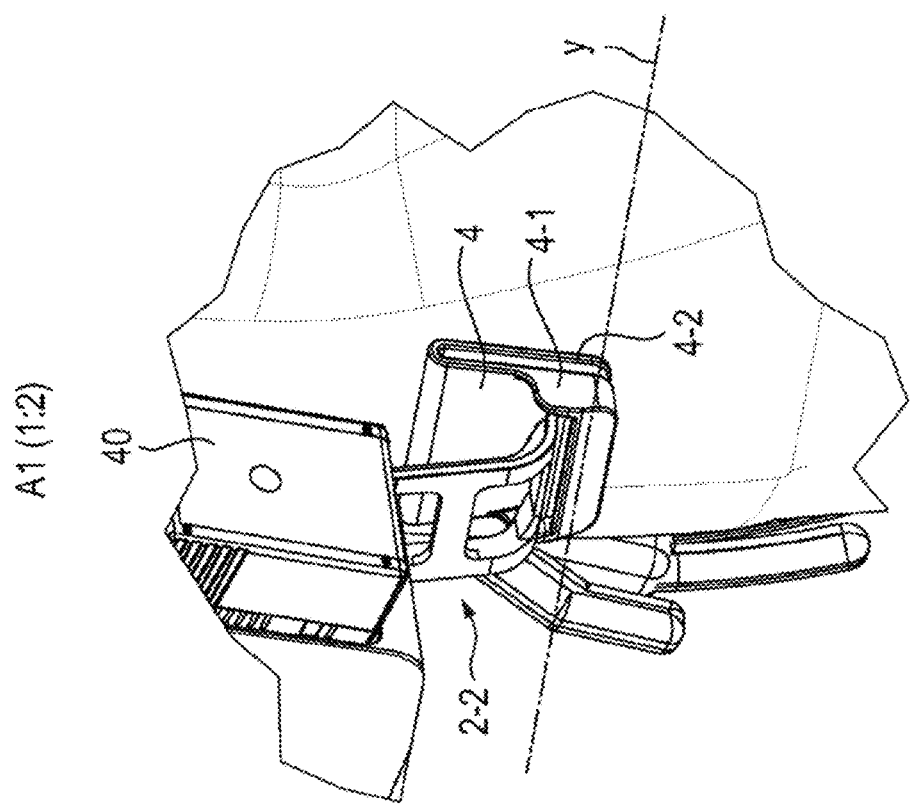
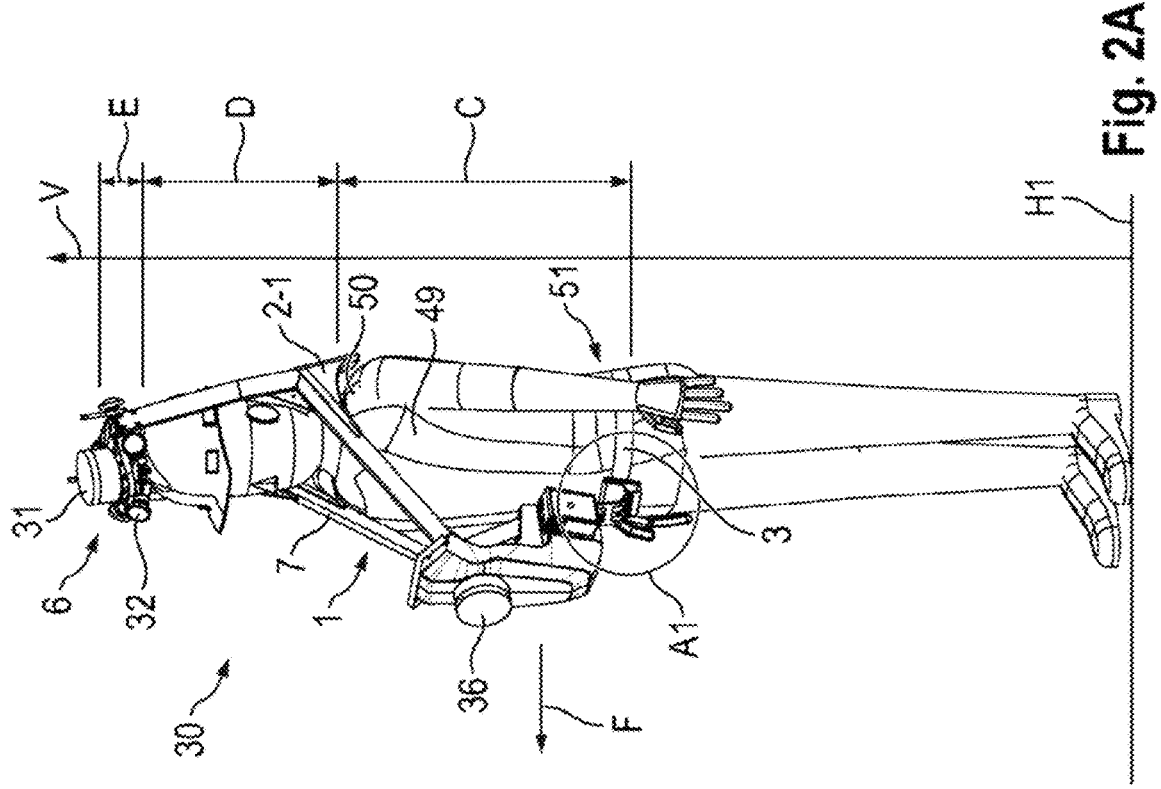
Fig. 2B
Fig. 2A
Fig 2

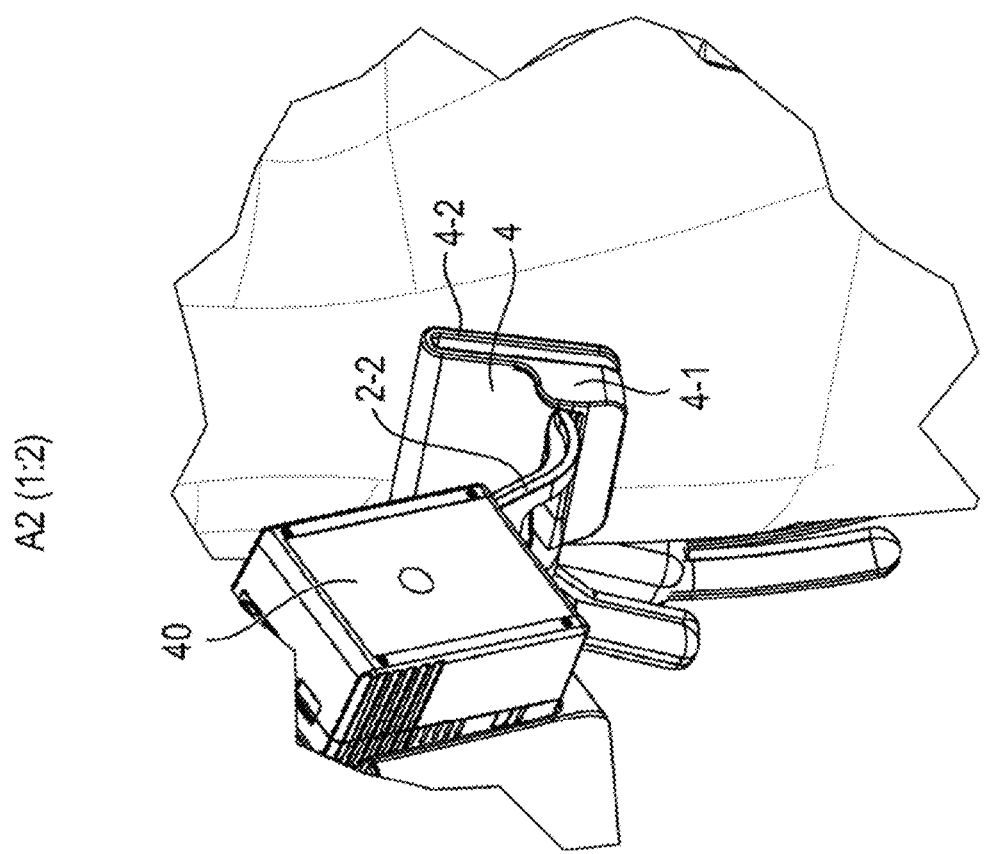
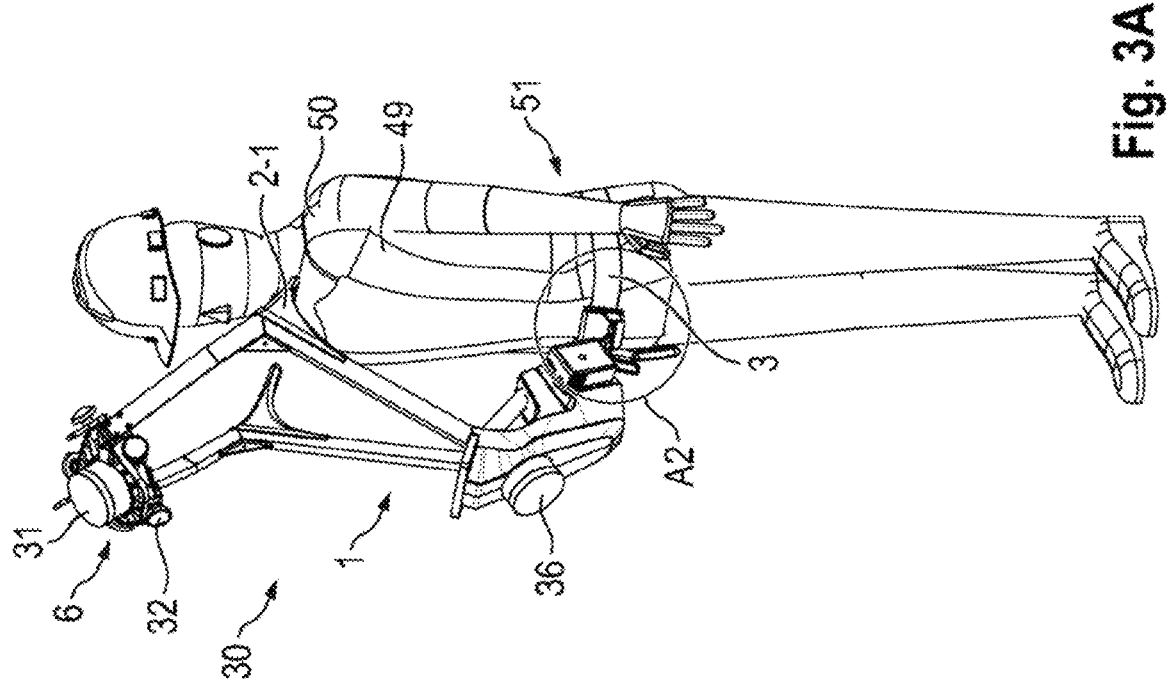
Fig. 3B
Fig. 3A

FRAME FOR AT LEAST ONE SCANNING DEVICE AND SPATIAL DETECTION DEVICE WITH AT LEAST ONE SCANNING DEVICE

FIELD OF THE DISCLOSURE

The disclosure relates to a frame for at least one scanning device for carrying the scanning device by means of a person's body, wherein the frame comprises a supporting device for fitting and carrying the frame by the person. The supporting device comprises a shoulder rest for fitting the frame on the person's shoulders. The frame further comprises an upper frame section, to which a first holder for the at least one scanning device is fastened, wherein the first holder is located above the person's head, when the person is carrying the frame by means of the supporting device. The disclosure further relates to a spatial detection device with at least one scanning device and one said frame.

BACKGROUND

Various detection systems are known for detecting object spaces within buildings and outdoors. The present disclosure relates in particular to the detection of an object space within a building. Such a system is described for example in EP 2 913 796 A1. In this case a laser scanner is used in conjunction with several cameras. From the signals of the laser scanner and the images of the cameras, a point cloud is produced, from which a three-dimensional model of the building is constructed.

For outdoors, comparable detection systems exist, which can be mounted on vehicles and aircraft. As a rule, the referencing of the acquired data to a coordinate system takes place in these systems by position determination by means of satellite navigation systems.

This possibility for position determination does not exist inside buildings, as no signal link to the navigation satellites is available. In addition, position determination for detection of an object space by means of satellite navigation is not sufficiently accurate. For this reason, for position determination outdoors as well, additional use is made of wheel odometry, laser odometry or inertial navigation (INS). Satellite navigation plays a role therein for georeferencing and reduction of long-term drift.

For position determination within buildings during mobile detection of object spaces, position determination in real-time that is as rapid as possible is required in particular, so as be able to provide the operator of the system with a representation of the detection operation in the surroundings in real-time on a display screen, so that the operator can control the detection operation in such a way that the internal space of the building is scanned with as few gaps as possible and in high quality.

It is further required that downstream position determination that is as accurate as possible, as a function of time, i.e. determination of the path in detection of the object space, is possible in postprocessing. It is only in this case that the continuously acquired measurements of the laser scanner and the panoramic images, as a rule recorded at a distance of a few meters in each case, are joined together into an accurate, consistent 3D model of the building, for example by constructing a point cloud or a polygon network.

The various methods for position and path determination are discussed in more detail below. First there is presentation of the data acquisition methods and application scenarios:

In the acquisition of point clouds by means of laser scanners, as a rule systems are used in which a laser beam is emitted by a mirror rotating about an axis in a plane in the space. Alternatively, phased-array lasers without moving parts may be used to produce a scanning laser beam.

The data supplied in this case as a rule contain, for each data element (point of the point cloud), the respective time stamp of the respective emitted laser pulse with the associated angular position within the rotation axis. Moreover, each of these data elements contains one or more values that are derived from one or more successively received reflection signals and give the distance of the respective reflecting surfaces in the direction of the emitted beam, calculated from the laser light transit time, and the associated reflection intensities. Semi-transparent or semi-reflecting surfaces may mean that several reflection signals are received shortly after one another, which then belong to surfaces at different distances.

Distances are calculated from the reflection signals received. Then, together with the intensities of the reflection signals, it is possible to calculate three-dimensional point coordinates, which then form the point cloud. In order to be able to construct a consistent three-dimensional model from the detection operations by means of the moving laser scanner, a time stamp and the exact positional orientation of the laser scanner in the space are captured for each measurement.

The procedure is similar with the image data from panoramic cameras, which as a rule only consist of image files that are provided with a time stamp of the recording time point. Once again, for each time stamp and for each image file, the exact position and orientation of the respective camera in the space must be known or be determined, so that—with the aid of camera parameters that are known or are to be determined by calibration, for example such as objective focal length and imaging characteristics, and sensor size and resolution—the image data and the point cloud data can be assigned to one another. In this way, an object space can be captured in three dimensions.

Panoramic images can in addition be used to make a very realistic virtual tour through the captured object space possible. Here, the image files are to the fore, which can be joined together into continuous 360-degree panoramas by means of so-called "stitching" with the aid of the 3D information (position and orientation of the respective camera in the space), which correspond to the precise view at a particular point of the surroundings, as would be perceived by an observer on the spot. All of the panoramic images together then represent a plurality of individual discrete positions at which the underlying images were recorded. The observer can only jump from one discrete position to another discrete position and change from panoramic image to panoramic image, in contrast to the point cloud model presented above, which it is possible to "fly through" continuously. The point cloud model present as background information can then be used for animating the transitions between the individual panoramic images as cross-fades of differently transformed individual partial sections (for example table surfaces) in such a way that the observer receives the impression of a reasonably fluid movement in the 3D space between the two discrete positions. The point cloud model also provides further possibilities, for example such as a fade-in of the point cloud over the photo-panoramic view or an assignment of an exact 3D coordinate to each pixel of the panoramic image (which for example allows length measurements of recorded objects by clicking on the boundary points in the panoramic image and the fade-in of position-related data ("Points of Interest") in the panoramic images).

For smaller buildings, detection of the surroundings in the internal space of the building by simultaneous recording of point cloud data and panoramic images is also possible with stationary, tripod-mounted equipment, which is moved from position to position. The positions may in this case for example be aligned with fixed reference points and marks in the space, which are also given in plans already existing beforehand, which makes assignment easier.

For rapid capture of large buildings, in particular of the internal space of the building, however, continuous capture by a mobile system is advantageous. For example, mobile equipment in "trolley" configuration, which is pushed by an operator, is used for this. A mobile frame provides greater stability in this case. In the position at rest, vibration-free images may therefore be recorded. Moreover, larger and heavier camera lenses of higher quality, laser scanners, electronic components and energy storage devices can be fastened to the mobile equipment and thus be moved very comfortably. With all the aforementioned mobile detection systems there is the problem, as explained above, that the path, and for systems that are intended to make visual monitoring of the detection operation on a display screen possible, the instantaneous position must also be determined efficiently and accurately in real time.

Various method may be used for this, and they may also be combined. On the one hand, inertial measurement units (IMUs) may come into consideration for inertial navigation, which combine one or more inertial sensors, such as acceleration sensors and angular rate sensors. However, a problem with this is that measuring errors add up, which may lead to severe drift. For this reason IMUs are often only used for support. The same applies to odometers.

In practice, in addition so-called SLAM (Simultaneous Localization and Mapping) methods are also used for mobile systems. These are based on the assumption that the detected environment is static and only the detection system itself is moving. In the case of a laser scanner, for example the acquired data of a laser mirror rotation pass are compared with those of one or more preceding passes. On the assumption that the environment is static and the detection system has moved linearly, parallel to the laser scanning plane, the two point sets of the two measuring passes would, within measuring tolerances, more or less coincide, but would be displaced in translation and/or in rotation, so that a profile of the environment as a 2D section through the 3D space (corresponding to the plane of the laser scanner) and at the same time the movement/rotation of the detection system within this 2D section are produced from this immediately and simultaneously (hence the term "Simultaneous Localization and Mapping"). In practice, however, in this case the movement and in particular the rotation should not take place too quickly in relation to the scanning frequency.

The algorithmic attribution of temporally separate measuring points to identical, repeatedly scanned features of the environment and hence the determination of the path of the detection system and the creation of a complete model of the environment is indeed also possible with a sufficient quantity and redundancy of measuring points, if the laser scanner acquisition direction varies as a function of time and is arranged arbitrarily relative to the movement of the detection system, depending on the size and distribution of the point cloud and features in the space this may nevertheless require very long computation times, so that as a rule these methods can only be used with a degree of detail in postprocessing, but not for real-time representation of the movement in the space during the detection operation. Thus, for example with the aforementioned stationary, tripod-mounted solutions, it is usual to upload the acquired data of the individual scan positions to a cloud-based computer center and have the data combined there in postprocessing into a consistent model.

Comparable to this, there are photogrammetric methods, in which from a plurality of images, recorded of one and the same object or the same environment from different viewing angles, a textured 3D model can be constructed, using for example the so-called bundle-adjustment method, in which the positions of the points in the 3D space, the positions and orientations of the observing cameras and their internal calibration parameters are adapted to the measurement images simultaneously in an optimization process. These methods yield good results for well textured surfaces, but fail with surfaces of the same color and with few features, and with more complicated sections and reflective objects.

In virtual reality or augmented reality applications, which can also be executed from mobile phones (smartphones), there are in addition solutions that function similarly to the SLAM method or photogrammetric methods. In this case sequences of images of the smartphone cameras captured in real-time are analyzed, in order to track features of the environment as a function of time, as a rule supported by measured data of the IMUs also installed in smartphones, so that a coarse detection of the environment and of the movement of the smartphone in space in real-time can be derived, which then for example makes possible the fade-in of virtual objects with accurate register in the camera viewfinder image.

For smaller spaces and short distances, so-called "structured light" solutions are also suitable, in which (infrared) point patterns are emitted from the detection system, and their distortion in the camera image provides conclusions about the 3D structure of the captured scene.

Furthermore, so-called time-of-flight cameras are known, which, similar to a laser scanner operating in parallel, emit a flash and, for each pixel of the camera sensor, determine very precisely the individual time point at which the reflection signal is detected, so that distance information for the relevant pixel is generated from this via the light transit time. However, owing to the low resolution and the limited range and precision, these systems are not suitable for detailed detection of large buildings.

The same applies to stereoscopic depth cameras, which, similarly to the human eye, obtain depth data from the parallax information of two camera images. Once again, the precision and resolution are not adequate for survey applications.

For high-precision detection systems, with which larger buildings are to be scanned to an accuracy of a few millimeters (e.g. trolley-based mobile mapping systems), laser scanners are therefore particularly suitable.

With these mobile mapping systems, the real-time visualization of the detection operation and of the motion in the space can then take place on an operator display screen particularly easily, robustly and quickly, if—as shown in the above example—a 2D laser scanner scans in a plane that remains constant during the motion, i.e. the detection system also moves in a 2D plane parallel to this, as is the case in buildings with flat floors in the rooms and passageways. This is also called 2D-SLAM or Realtime-2D-SLAM with three degrees of freedom (3 DoF) (i.e. 2 space axes X-Y and one rotation axis-"yaw").

As the aforementioned laser scanner arranged for the 2D-SLAM method is oriented horizontally during motion through the space and always scans the same constant plane and does not detect the space itself with area coverage, additional 2D laser scanners, which are arranged in other planes, are therefore used for acquisition of the actual point cloud, so that as the detection system advances, these scanning planes sweep the space uniformly, so that the environment is scanned and recorded as uniformly and completely as possible.

In the capture of large buildings it is desirable to capture areas as large as possible in a continuous scanning operation without interruption, in order to keep the expense for the so-called registration, i.e. the joining together of partial point cloud models from individual partial scanning operations into a complete point cloud model by exact alignment and smoothing of the overlap regions of the partial point clouds, as low as possible. This registration operation is admittedly possible algorithmically in principle, but may, depending on the size of the partial models, be computation-intensive and yet still require manual pre- or post-adjustment.

Trolley-based mobile mapping systems that operate with 2D-SLAM methods have as a rule required up to now termination of the current scanning operation and starting of a new scanning operation, for example as soon as a rather large step, steep ramp or even staircase has to be negotiated, even if individual systems are able, for example by evaluating IMU data, to process ramps with small slopes or to level out disturbances due to speed bumps, running over cables etc. with correction algorithms.

Moreover, detection systems are known with six degrees of freedom (6 DoF) (i.e. three directions in space X-Y-Z and three directions of rotation ("roll-pitch-yaw"/6DoF-SLAM methods).

For example, the work by George Vosselman, "*DESIGN OF AN INDOOR MAPPING SYSTEM USING THREE 2D LASER SCANNERS AND 6 DOF SLAM*', ISPRS Annals of the Photogrammetry, Remote Sensing and Spatial Information Sciences, Volume II-3, 2014. ISPRS Technical Commission III Symposium, Sep. 5-7, 2014, Zurich, Switzerland. 10.5194/isprsannals-II-3-173-2014 (https://www.isprs-ann-photogramm-remote-sens-spatial-inf-sci.net/Il-3/173/2014/isprsannals-II-3-173-2014.pdf) describes a method for detecting an object space within a building. Several single-plane scanners are used, the scanning planes of which are not arranged parallel to one another. However, the processing of the data captured with this system is very costly in algorithmic terms, so that this method is not suitable for real-time visualization of the scanning operation, but only for calculation of a point cloud model in postprocessing. In addition, a detection system in six degrees of freedom with 3D-SLAM methods is known from EP 3 228 985 A1.

Various laser scanners are known from DE 10 2011 121 115 B4 or DE 10 2004 050 682 A1. Moreover, a multiple scanner, which emits fan-shaped signal beams and measures the reflections of these signal beams, is known from EP 2 388 615 A1 and US 2017/0269215 A1.

Trolley-based systems may be used in particular when the building for detection has a flat floor, so that the trolley-based system can be rolled over the floor. In buildings with an uneven floor or in buildings with very many stairs, steps, steep ramps or nested structures, in which a trolley-based system cannot be pushed for quite long stretches and often would need readjustment owing to a difference in levels, portable systems in knapsack form or hand-held systems of various designs are known. Such systems are subject to weight restrictions. The weight must be low enough for the system still to be carried by one person or held in the hand. In addition, the scanning devices must be configured so that, despite the movements that a person with the scanning device makes, vibration-free, sharp photographs can be generated.

A spatial detection device, which comprises a scanning device and a frame, which can be carried on a person's shoulders or by means of a wheelchair, is known from U.S. Pat. No. 6,141,034.

SUMMARY

One aspect of the disclosure relates to a frame and a spatial detection device of the kind stated at the beginning, which make it possible for the scanning device to be carried through a building by one person, wherein the space can be captured during movement through the building. Moreover, particularly good manageability of the frame by the person carrying the frame should be ensured.

Advantageous embodiments and variants are disclosed herein.

The frame according to the disclosure is characterized in that the supporting device further comprises a contact part, which is connected rigidly to the shoulder rest via a bracket, wherein the contact part is located at the level of a person's hip region, when the person is carrying the frame by means of the supporting device.

The frame according to the disclosure may advantageously be supported on the body of the person who is carrying the scanning device by means of the frame, at least at two points: On the one hand there is support via the shoulder rest, which rests on the person's shoulders. On the other hand, via the contact part, support may take place at a person's hip region. In this way, both the weight of the frame with the devices fastened thereto can be carried. Furthermore, the frame can be stabilized with respect to its spatial orientation. This makes particularly good handling of the frame possible when putting it on and as the person moves in a space, while for example the space of a building is captured with a scanning device fastened to the frame.

With the spatial detection device according to the disclosure it is possible in particular to capture difficultly accessible buildings or terrain, e.g. construction sites or other exterior terrain and environments, for example caves.

The complete frame is in particular of rigid construction. With the frame in the operating state, the relative position of the first holder, of the shoulder rest and of the contact part does not change while the frame is in use. The frame is in particular rigid against torsion.

According to one embodiment of the frame according to the disclosure, the bracket is arranged in front of the person, when the person is carrying the frame by means of the supporting device. As a result, the operability of a scanning device fastened to the frame and of any other devices is improved. At the same time, there is less risk of the person carrying the frame and moving, bumping into other objects in the space with the frame. The person can see the dimensions of the frame carried in front of the body and therefore even with rotating movements is better able to estimate whether the frame will possibly collide with other objects.

According to one embodiment of the frame according to the disclosure, two brackets are provided, wherein one bracket extends from the contact part to a first shoulder rest and the other bracket extends from the contact part to a second shoulder rest. Moreover, the upper frame section can be divided into two parts: a first upper frame section extends from the first shoulder rest to the first holder and a second upper frame section extends from the second shoulder rest to the first holder. The person carrying the frame is then able to look through between the brackets or the upper frame sections.

According to a variant of the frame according to the disclosure, the latter is configured so that it can additionally also be carried on the back like a knapsack. For example, the person can carry the frame on the back for transport purposes, when the space is not to be captured by means of the scanning device.

According to a variant of the frame according to the disclosure, it has a central hinge by which the frame can be folded up. In this way, advantageously the frame can be made smaller for transport purposes. For the frame, however, it is especially important that the spatial relations of devices that are fastened to the frame are maintained very accurately. Therefore the central hinge preferably has at least two locking positions: One locking position for a folded-up state of the frame, and another locking position for an operating state of the frame. In this way it is possible to ensure that especially in the operating state of the frame, the spatial relations of devices fastened to the frame are always exactly the same.

The hinge is in particular configured in such a way that a calibration between several scanning devices that are fastened to the frame is maintained after folding the frame and unfolding it again. After folding-up and unfolding, the scanning devices must not need recalibrating. To this end, in particular the hinge is particularly torsion-proof.

According to one embodiment of the frame according to the disclosure, this may alternatively or additionally be taken apart and put back together. Again in this case, the plug and socket connection is configured so that after dismantling and reassembly, no recalibration of scanning devices is required.

According to a variant of the frame according to the disclosure, the supporting device further comprises a hip rest, which corresponds to the contact part. The contact part may in particular rest on the hip rest in such a way that the weight of the frame and the devices fastened thereto can be taken at least partly, preferably mainly, via the hip rest. For this purpose, the hip rest has in particular an upward directed support, on which the contact part can be supported. The hip rest may in its turn be supported on a hip strap or a belt of the person carrying the frame. Advantageously, as a result the weight of the frame and of the devices fastened therein can be distributed on the shoulders and the hip of the person carrying the frame.

The hip rest interacts with the contact part in particular so that the contact part swivels about a first axis, when it is supported on the hip rest, but swiveling about an axis perpendicular to the first axis is blocked. The first axis is in particular a transverse axis, which is oriented transversely to the person's direction of movement, when the person is carrying the frame and therefore is moving forward. The interaction of the hip rest with the contact part thus ensures that the frame can only tilt forward about the transverse axis if the frame is carried by the person with a forward oriented bracket. Sideways tilting of the frame is blocked by the contact part. The swiveling of the contact part with respect to the hip rest about only one axis leads advantageously to a more robust construction of the frame. When using the frame with a scanning device, this leads to sharper image recordings and a more accurate capture of the object space.

Furthermore, the hip rest may be configured so that rotations of the frame relative to the hip rest about a vertical axis are also impeded, and preferably prevented.

For this purpose, for example the contact part has an oblong transverse edge, with which it rests on the hip rest. The first axis is then oriented parallel to the transverse edge of the contact part. The contact part has in particular a plate, at which the oblong transverse edge is formed. The plate can in particular be inserted in the hip rest from above. There it rests on the hip rest and can be tilted forward about the oblong transverse edge.

Moreover, the hip rest may have vertical cheeks, which impede swiveling of the contact part resting on the hip rest about an axis perpendicular to the first axis. The contact part is therefore in particular inserted in the hip rest in such a way that swiveling forwards is possible; swiveling in the transverse direction sideways and/or rotation about a vertical axis relative to the hip rest are, however, prevented by the vertical cheeks.

Through the interaction of the contact part with the hip rest, the degrees of freedom of the frame, when carried by a person by means of the supporting device, are restricted. As a result, the frame is stabilized on the person. The possibility of swiveling or tilting the frame forwards is advantageous especially when the frame is too high for moving about in a space. In this case it is not necessary to take the frame off completely; rather, it is possible to swivel the frame forwards about a defined axis and then swivel it back again about the defined axis. In this way the person can for example pass through a low passageway, against which the frame would bump when carried by the person. The orientation of the frame to the person is maintained, in particular relative to any rotating motion about a vertical axis, which is perpendicular to the first axis.

In an alternative configuration of the frame according to the disclosure, the hip rest may also be coupled to the contact part of the frame via a bottom hinge. The frame can in this case be swiveled via the bottom hinge about the first axis. Simultaneously, the hinge effectively prevents swiveling of the frame about an axis perpendicular to the first axis.

According to a variant of the frame according to the disclosure, the shoulder rest has a curved segment with an upper vertex. On one side of the vertex there is transition of the curved segment to the bracket. On the other side the curved segment has at the end a distance from the vertex in the longitudinal direction of the frame that is in a range of from 50 mm to 100 mm. The longitudinal direction of the frame is the vertical direction when the frame is being carried by a person. In this way, the curved segment rests on the person's shoulder and surrounds the latter backwards and downwards in a certain region. However, the curved segment projects downwards behind the shoulder so slightly that it is possible for the person, by slightly lowering the shoulder, to swivel the frame forwards about the oblong transverse edge of the contact part. In the normal position of the shoulder, however, tilting forward is prevented by the curved segment, as it ends at the back below the vertex. Advantageously, the frame may as a result be carried at least partly on a person's shoulders, but at the same time, simply by lowering the shoulders, it can be removed from them, so that it can be tilted forward about the transverse edge of the contact part, which is supported on the hip rest.

With the frame according to the disclosure, the contact part is at the level of a person's hip region, when the person is carrying the frame by means of the supporting device. The height of a person's hip region means, in the sense of the disclosure, a vertical region that extends from the height of the person's crotch to the lower ribs. For the frame, the distance from a person's hip region to the height of the shoulders is relevant. This distance can be determined from usual measurements of persons who are able to carry the frame.

In the longitudinal direction of the frame, i.e. in a vertical direction when the frame is being carried by a person, the distance between the shoulder rest, in particular the vertex, and the contact part, in particular the transverse edge, is in a range of from 400 mm to 800 mm, in particular in a range of from 500 mm to 700 mm. Preferably the bracket and/or the contact part are adjustable for height, i.e. the aforesaid distance can be set. Moreover, both the bracket and the contact part may also be adjustable for height, so that the distance between the shoulder rest and the contact part can be adapted for the person who is to carry the frame. After a height adjustment of the bracket, however, the multiple scanners described hereunder would have to be calibrated to each other again.

According to a further configuration of the frame according to the disclosure, in the longitudinal direction of the frame between the shoulder rest, in particular the vertex, and the first holder, in particular a lower edge of the first holder, there is a distance in a range of from 300 mm to 500 mm, in particular in a range of from 350 mm to 400 mm. The person's head is arranged in this region when carrying the frame. The distance between the first holder and the shoulder rest should be selected in such a way that the person carrying the frame can still wear a helmet. Thus, even when carrying the frame, the person's head is free, so that an unobstructed view at least forwards is ensured. Furthermore, it is possible to wear a helmet for safety reasons.

According to a further configuration of the frame, a second holder is arranged on the bracket, to which an additional scanning device can be fastened, wherein the second holder is located in front of the person, when the person is carrying the frame by means of the supporting device. The frame is thus configured in this case for fastening several scanning devices. The arrangement of the additional scanning device in front of the person carrying the frame leads to better manageability of the scanning device and better weight distribution. The second holder is in particular fastened rigidly to the frame and therefore also rigidly to the first holder.

The disclosure further relates to a spatial detection device with at least one scanning device and the frame according to the disclosure, as has been presented above. The spatial detection device can thus be carried very well by one person. Moreover, improved handling of the spatial detection device is provided because the frame can be swiveled forwards very easily, for example for maneuvering through doors and narrow places, while the person with the spatial detection device moves through a building. With the spatial detection device according to the disclosure it is thus possible in particular to capture difficultly accessible buildings or terrain, e.g. construction sites or other exterior terrain and environments, for example such as caves.

According to one embodiment of the spatial detection device according to the disclosure, the scanning device is a first multiple scanner. The first multiple scanner is fastened to the first holder of the frame above the person's head, when the person is carrying the spatial detection device by means of the frame.

The first multiple scanner comprises in particular a plurality of emission units integrated in one component for producing a plurality of signal beams in defined directions of emission, a receiver for detecting reflected radiation, which is produced by reflection of the signal beams on one or more objects of the object space, and a scanning device for altering the directions of emission of the signal beams. The use of the multiple scanner makes the uninterrupted capture of the object space possible. Through the use of the multiple scanner it is possible to use a real-time 3D-SLAM method with six degrees of freedom. It is not necessary to divide the detection operation into partial operations and put these partial operations back together again in postprocessing.

The use of the multiple scanner in the spatial detection device according to the disclosure offers the advantage that the device during movement always captures not only new surface segments of the object space, as the signal beams sweep over these surface segments, but that the signal beams always also impinge on surface segments already captured previously, i.e. surface segments that have already been captured by other signal beams emitted previously. This makes it possible to compare the reflected radiation detected by the receiver with reflected radiation already detected previously. From this comparison it is then possible to calculate the movement of the spatial detection device, so that it is possible to determine the position of the spatial detection device in the object space. This in turn makes it possible to produce and output a graphical representation of the regions of the object space through which the spatial detection device was moved. Then on the basis of a preliminary modeling of the object space based on the data that can be obtained at least from the reflected radiation, it is possible to determine through which regions in the object space the spatial detection device can be moved. These possible movements of the device in the object space may in addition be presented graphically and output.

The arrangement of the first multiple scanner above the person's head offers the advantage that the object space is captured roughly from a natural observation height for a person. At the same time there is no shading by the person who is carrying the first multiple scanner by means of the frame, so that all-round acquisition from a vertical position above the person's head is possible.

The first multiple scanner is in particular oriented in such a way that the scanned middle plane of the first multiple scanner makes a first angle with a horizontal plane that is in a range of from 5° to 20°, in particular in a range of from 8° to 12°, when the person is carrying the spatial detection device by means of the frame. Preferably the angle is 10°. The middle plane of the first multiple scanner is therefore in particular oriented substantially horizontally, optionally tilted forward somewhat.

The directions of emission of the first multiple scanner are in particular fan-shaped, so that an emission fan with a central axis is formed. The multiple scanner is in particular mounted on the frame in such a way that the plane formed by the emission fan is oriented vertically. The aperture angle of the emission fan may in particular be in a range of from 25° to 35°. The aperture angle is preferably 30°.

The emission units of the multiple scanner are in particular one or more lasers. The signal beams may be emitted by several lasers simultaneously, fan-shaped in the directions of emission. Preferably, however, laser pulses (signal pulses) are emitted successively in the directions of emission, so that the emission fan of the signal beams in the directions of emission is only produced when considering a defined time interval. The laser pulses in the directions of emission may be emitted by one laser, whose direction of emission is varied. Preferably, however, several lasers are used, which emit pulses successively in various directions of emission. The spacing of the pulses may be selected so that the reflection of the laser pulse is detected before the next laser pulse is emitted. Therefore the time spacing between the laser pulses depends on the range that is to be reached by the signal beams for detecting the object space.

The scanning device is in particular configured to rotate the directions of emission of the signal beams about a rotation axis. The first multiple scanner therefore scans the volume of the solid of revolution of a fan. According to a preferred embodiment, the first multiple scanner is mounted on the frame in such a way that the rotation axis is inclined at an angle to the vertical that is in particular in a range of from 5° to 20°, advantageously in a range of from 8° to 12°, when the person is carrying the spatial detection device by means of the frame. This angle is preferably 10°. As a result, in the direction in which the rotation axis is tilted, closer surface segments of the ground on which the person carrying the spatial detection device is moving can be captured. In the opposite direction, the emission fan is in contrast tilted upward, so that fewer regions below the first multiple scanner are irradiated.

The rotation axis of the first multiple scanner is therefore tilted forwards, in particular with respect to a direction of movement of the spatial detection device. The tilting of the rotation axis is, moreover, advantageous for the real-time 3D-SLAM method. In this case, in fact not only sections through the object space extending exactly horizontally to the direction of movement are supplied for real-time visualization, but sections extending transversely to the direction of movement.

As a result, on the one hand the data required for the SLAM method are still captured, i.e. recurring features of the environment, which are captured in successive rotation passes of the multiple scanner, in particular configured as a laser scanner, are recognized. Thus, for example a feature of the environment that was captured in a rotation pass in a first scanning plane of the multiple scanner might re-emerge in the next rotation pass in the detection data set of the next or next but one plane of the scanner.

On the other hand, large spatial regions for the purpose of 3D visualization for the operator are also captured quickly, including mainly closely located features of the floor in front of the spatial detection device and more remote features of the ceiling behind the spatial detection device. In particular, visualization of the detected environment in 3D becomes possible, and actually in a representation that provides more detail than a multiple-slice-line-section representation, which preferably finds application when it is a question of rapid acquisition of large spatial regions in real time, in particular with a long range forwards in the direction of travel, such as is relevant for example in autonomous driving.

According to a variant of the spatial detection device according to the disclosure, in addition at least one camera is fastened to the first holder of the frame, namely above the person's head, when said person is carrying the spatial detection device by means of the frame. Preferably several cameras are fastened to the first holder of the frame above the person's head.

The camera or cameras mounted on the first holder of the frame are in particular configured for recording camera images of at least a part of the object space. The images recorded by the camera or cameras can be taken into account in the production of the various graphical representations of the object space in real time. In this way, a very realistic representation of the accessed and/or accessible region of the object space or of the region of the object space already scanned by the spatial detection device can be produced in real time.

The taking angle of the camera or cameras in a vertical plane is in a range of from 170° to 210°, in particular in a range of from 180° to 200°, wherein the person is mainly positioned outside the taking angle, in particular completely outside the taking angle, of the camera or cameras, when the person is carrying the spatial detection device by means of the frame. The angle is preferably 195°. The camera or cameras therefore allow substantially complete capture of the spatial region in front of the person, in particular around the person, wherein the camera or cameras are arranged in such a way that the person carrying the spatial detection device is mainly outside the taking region, in particular completely outside the taking angle, of the camera or cameras.

If several cameras are used, in particular these are arranged spaced apart on a ring, in particular a circular ring, wherein the ring, in particular the circular ring, is oriented substantially horizontally, when the person is carrying the spatial detection device by means of the frame. The cameras are in particular arranged on a horizontally oriented regular pentagon.

The horizontal distance of the cameras is in particular selected to be as small as possible, so that the space captured by the cameras in the environment of the person carrying the spatial detection device is as large as possible in the direct environment of the person, wherein the person is, however, located mainly outside the taking angle, in particular completely outside the taking angle, of the cameras, when the person is carrying the spatial detection device by means of the frame. Advantageously, in this case all-round recording by means of the camera is possible, which, however, omits the spatial region in which the person carrying the spatial detection device is located.

In the longitudinal direction of the frame, the distance between the shoulder rest and the cameras is in particular in a range of from 300 mm to 500 mm, in particular in a range of from 350 mm to 400 mm.

The first multiple scanner is in particular arranged above the camera or cameras. In the longitudinal direction of the frame, the distance between the first multiple scanner, in particular the exit point of the emitted radiation, in particular of the central ray of the emission fan, and the camera or cameras, in particular in the middle of an objective, is in particular in a range of from 50 mm to 100 mm, in particular in a range of from 60 mm to 80 mm. A distance as small as possible between the multiple scanner and the cameras leads advantageously to a parallax error as small as possible between the point cloud data captured by the scanner and the image data captured simultaneously by the camera, which is advantageous for coloring of the point cloud data with the aid of image data ("Point Cloud Coloring").

With this arrangement of the multiple scanner and the cameras, a practicable compromise is found between two opposing requirements: An arrangement of the cameras as high as possible would indeed make it possible for the "baseline", i.e. the camera distance, to be minimized, so that so-called stitching artifacts would be minimized, while at the same time other parts of the head or shoulders of the person carrying the spatial detection device would only be visible in the captured images in a smaller angular region owing to the larger distance. This would lead to an optimal all-round recording of the surrounding space with minimal stitching artifacts. With a very high arrangement of the cameras, the spatial detection device would, however, extend well above the head of the person carrying the spatial detection device, so that the person would not be able to move in low spaces or through door openings without tilting the spatial detection device forwards. Furthermore, the spatial detection device could not in this case be carried as stably by a person. The deviations in movement of the person at the height of the cameras would also be very much greater. Moreover, an excessively high recording height of the images would be a disadvantage, as the resultant panoramic view would not correspond to the natural viewing height of an observer.

The arrangement of the cameras and of the multiple scanner above the head is also advantageous relative to an arrangement at head height or below the head of the person carrying the spatial detection device, because in this case undisturbed all-round recording is possible, and the person's field of view is not impaired. The dead angle produced with the cameras can be minimized, wherein at the same time practicable use of the spatial detection device while carried by a person is maintained.

The number, the distance, the angular orientation, the positioning and the field of view, as well as the focal length of the cameras, and optionally also of the first multiple scanner, are optimized with the spatial detection device according to the disclosure, so that a natural recording height, which corresponds essentially to the viewing height of a human observer of the environment who is standing erect, is made possible and at the same time the so-called baseline, i.e. the camera distance, is kept small, so that stitching artifacts are reduced, whereas at the same time, as exactly as possible, only the spatial region below the cameras, in which the person carrying the spatial detection device is located, is omitted. The arrangement in the vicinity of the person's head then serves simultaneously as protection against accidental bumping against objects that are located above the head.

According to a variant of the spatial detection device according to the disclosure, additionally at least one receiving antenna and/or an inertial measurement unit are fastened to the first holder of the frame above the person's head, when the person is carrying the spatial detection device by means of the frame. The receiving antenna serves for receiving signals from transmitting stations of a wireless local network (WLAN/WiFi). Moreover, an additional receiving antenna may be provided, which serves for receiving signals from Bluetooth transmitters. The receiving antenna or antennas are coupled to a signal processing unit. In this way, signals of wireless local networks and/or Bluetooth signals can be detected with respective receiving strength and stored, while the spatial detection device is moving. A spatial profile of the ID identifications of the transmitting stations (WLAN-/WiFi-SSIDs, Bluetooth beacons) and their spatially varying signal strengths can be constructed from these acquired signals. This is known by the term WLAN/WiFi or Bluetooth "fingerprinting". The recorded profile of ID identifications and receiving strengths may serve for subsequent position finding of mobile phones that are moving through the space. In this case, for example ID identifications of the transmitting stations are captured by the smartphone in real time by means of an indoor navigation app and their signal strengths are measured and compared, e.g. via a server-based database, with the profile recorded previously by the spatial detection device, in order to derive position finding therefrom.

The inertial measurement unit (IMU) may comprise acceleration sensors and angular rate sensors. Through evaluation of the signals of the inertial measurement unit, it is possible to determine the movement of the spatial detection device in the space, and therefore the temporal variation of the position in the space.

According to a variant of the spatial detection device according to the disclosure, the frame comprises a bumper. In this case, in particular the first multiple scanner and/or the receiving antenna and/or the inertial measurement unit are surrounded by the bumper. As a result, all the sensor devices that are arranged above the head of the person carrying the spatial detection device are protected.

According to a variant of the spatial detection device according to the disclosure, a state sensor is fastened to the frame, and is configured to detect how the frame is being carried by a person. The state sensor may in particular detect whether the frame is carried at least partly by the shoulder rest, or whether the frame has been swiveled forwards by means of the contact part and the hip rest, and is therefore arranged tilted in such a way that it is no longer resting on the person's shoulders. The state sensor may for example be provided by the inertial measurement unit in conjunction with an evaluator, by means of which the tilting movement of the frame in swiveling of the person's shoulders is captured. Alternatively, a shoulder sensor may also be provided, which is configured to detect whether the shoulder rest is resting on the person's shoulders. Alternatively or additionally, a hip sensor may also be provided, which is configured for detecting the orientation of the contact part relative to the hip rest. In particular, the vertical angle of the contact part is detected.

By means of the state sensor, for example the acquisition of the object space may be interrupted, if it has been detected that the frame has been tilted forwards, for example in order to pass through a narrow place or a low door opening. These state data may be taken into account in the processing of the captured scanning data, e.g. in the postprocessing, so that point cloud artifacts, which may form if the laser scanners scan parts of the person's body when taking off or tilting the spatial detection device, can be removed during processing of the data.

Additionally, by means of the state sensor it is also possible to detect whether the spatial detection device has been placed stably on the ground. Here, for example for energy saving purposes, the data acquisition as a whole could pause automatically, if the state sensors show that the spatial detection device has been placed stably on the ground, without impairing the consistency of SLAM position finding that is in progress. Switch-off of the spatial detection device is in particular desirable when it is passed from one operator to another or when for example bulky pieces of furniture in an environment must be moved.

It is also advantageous if data of the state sensors can also be used to homogenize and optimize the overall density and quality of the point cloud produced, e.g. through selective discarding of data, because on removal from the operator's body, there is a change of the otherwise uniform detection operation in normal walking, toward stronger fluctuations with respect to quality and density of the point cloud data, caused by the operator standing still, and tilting, turning or wobbling of the spatial detection device.

According to another embodiment of the spatial detection device according to the disclosure, a second holder, to which a second multiple scanner is fastened, is arranged on the bracket of the frame. The second multiple scanner is in particular oriented in such a way that a scanned middle plane of the second multiple scanner makes an angle with a vertical plane that is in a range of from—10° to +10°, in particular in a range of from −5° to +5°, when the person is carrying the spatial detection device by means of the frame. The angle is preferably 0°. In contrast to the first multiple scanner, the second multiple scanner is therefore oriented substantially vertically. The aperture angle captured by the second multiple scanner is in particular in a range of from 25° to 35°. The aperture angle is preferably 30°. With the spatial detection device according to the disclosure, a multiple scanner is therefore oriented substantially perpendicularly to the person's direction of movement. The other multiple scanner is oriented substantially parallel to the direction of movement. This means that the environment can be captured completely, and at the same time a good real-time SLAM is achieved.

The frame is in particular configured in such a way that more than 50% of the weight of the spatial detection device, if it is carried by a person by means of the supporting device, is carried by means of the hip rest. The largest part of the weight of the spatial detection device is therefore carried via the hip rest. The spatial detection device is stabilized against torsion in particular by the shoulder rests.

Moreover, the frame is in particular configured in such a way that it defines set-down points, on which the spatial detection device can rest freely on a horizontal plane so that the first multiple scanner and/or the second multiple scanner and/or the cameras do not come into contact with the horizontal plane. This ensures that the spatial detection device, when it is no longer being carried by a person, can be placed on a horizontal plane in such a way that none of the devices fastened to the frame are damaged.

According to a further configuration of the spatial detection device according to the disclosure, it comprises at least one reference mark, for example in the form of an arrow or a notch, for detecting the position and/or orientation of the spatial detection device relative to a stationary coordinate system with corresponding reference marks, which in their turn are affixed to particular points of the environment to be captured, for example as stickers on floors or walls of a building to be scanned, which are provided with cross hairs and a unique designation or identification number (called ground control point hereinafter). While a scanning operation is in progress, the spatial detection device is for example held briefly with the arrowhead of its reference mark exactly on the cross hairs of a ground control point and the time point and the unique designation or identification number of the ground control point are captured. Detection of the exact time point may take place by means of an ergonomically particularly favorably mounted separate actuating button, which is pressed as soon as the arrowhead and cross hairs come into contact. It is ergonomically favorable in this case if for example the actuating button can be reached from above, while the spatial detection device with the reference mark for example stands or is held upright on the ground, while it is in contact with the ground control point, or if the actuating button can be reached with a finger, while the spatial detection device is held with two hands by a handle with the reference mark against the wall. The actuating button is in particular arranged on the first holder, in particular with respect to the direction of motion behind the first multiple scanner.

With the aid of the ground control points, path determination by means of SLAM methods can be carried out particularly precisely, because for example necessary correction parameters due to accumulated drift in longer scanning operations can be determined. Data sets of parts of adjoining buildings detected in separate scanning operations, which for example overlap in the region of ground control points, may also be oriented particularly precisely to one another later and can be combined into a uniform data model. Preferably the ground control points are also applied at precisely defined points, which for example have been established on the basis of building plans or have been surveyed with conventional surveying techniques. As a result it is possible for the data captured with the spatial detection device according to the disclosure to be aligned or compared particularly precisely against data known or captured in other ways.

Alternatively, the ground control points may also be captured via the cameras of the spatial detection device, if these have for example a unique identification in the form of a QR code. Moreover, it is also possible to provide a laser pointer for space acquisition, by means of which a ground control point can be detected without contact, by directing the laser point of the laser pointers, e.g. at a defined distance, onto the cross hairs of the sticker.

According to a further configuration of the spatial detection device according to the disclosure, a control device, with data-technology coupling to the cameras, is fastened to the frame, wherein the control device is arranged for simultaneously triggering image recording by means of the cameras. In this way it is possible to produce all-round recording by means of the cameras for a particular time point.

According to a further configuration of the spatial detection device according to the disclosure, an evaluator is fastened to the frame below the person's head, when the person is carrying the spatial detection device by means of the frame, with data-target coupling to the cameras and/or the first multiple scanner and/or the WLAN/WiFi antennas and/or the inertial measurement unit, wherein data transfer takes place via a grouping and synchronizing interface, wherein the grouping and synchronizing interface is fastened above the person's head. For example, a USB cable can be provided between the cameras and the grouping and synchronizing interface and an Ethernet cable can be provided between the first multiple scanner and the grouping and synchronizing interface. USB cables or Ethernet cables may also be provided between the WLAN/WiFi antennas and the inertial measurement unit and the grouping and synchronizing interface. The grouping and synchronizing interface links the received data with precise time stamps which it itself produces, and simultaneously converts the received data so that the further data transfer can take place collectively over an individual USB cable or Ethernet cable. The bundling and synchronizing interface is then connected to the evaluator via said individual USB cable or Ethernet cable, so that data transfer can take place from the bundling and synchronizing interface to the evaluator, wherein only a single such data transfer cable has to be led from the bundling and synchronizing interface to the evaluator, which thus functions as a collective data transfer cable, and can in particular be laid inside tubes of the frame. Through the direct linkage of the data with precise time stamps received by the various units, still present in the grouping and synchronizing interface, possible timing and latency problems in connection with buffering and temporary storage on the further communications link to the evaluating unit and in the processing of the input data there, are minimized. The SLAM algorithms may therefore fall back on the time stamp of the received data assigned with minimum latency on the respective data sources close to the grouping and synchronizing interface, so that even with a high computation burden of the evaluator, possible delays or jumps in the processing sequence do not lead to problems with consistency or precision.

Moreover, the second multiple scanner can be coupled to the evaluator in the data technology respect. As the second multiple scanner is arranged spatially close to the evaluator, data transfer may in this case take place via a separate cable. However, it is also possible to couple the second multiple scanner to the grouping and synchronizing interface, so that the data supplied from this scanner can also be associated with the synchronization time stamps.

Advantageously, the spatial detection device according to the disclosure additionally has a display device coupled to the evaluator for displaying the graphical representations produced by the evaluator.

The evaluator is in particular configured to calculate in real time the position of the spatial detection device within the object space and/or the path of the spatial detection device, at least from data produced by detected reflected radiation, which has been detected by the receiver or receivers, and to output the results by means of a graphical representation. In this way, the accessed and/or accessible region of the object space, the already scanned region of the object space or the not yet scanned region of the object space are displayed in a total representation of the object space based on the data already captured. The person can thus identify, with the graphical representation, the regions of the object space that have yet to be captured. Additionally, the quality of the acquired data for the spatial regions captured in each case can be displayed in real-time in a so-called "live quality map", so that the person can assess which spatial regions must, if applicable, be captured even better.

Finally, the spatial detection device may have a data interface, which is coupled at least to the evaluator in the data technology respect and is configured to output data to a storage device for postprocessing.

BRIEF DESCRIPTION OF THE DRAWINGS

The disclosure will now be explained with an embodiment example, referring to the drawings.

FIG. 2A shows a person carrying the spatial detection device shown in FIGS. 1A and 1B, FIG. 2B shows a detail view of the circled area of FIG. 2A, FIG. 3A shows a person who is carrying the spatial detection device shown in FIGS. 1A and 1B in a forward-tilted state, FIG. 3B shows a detail view of FIG. 3A.

DETAILED DESCRIPTION

Figure 1A:
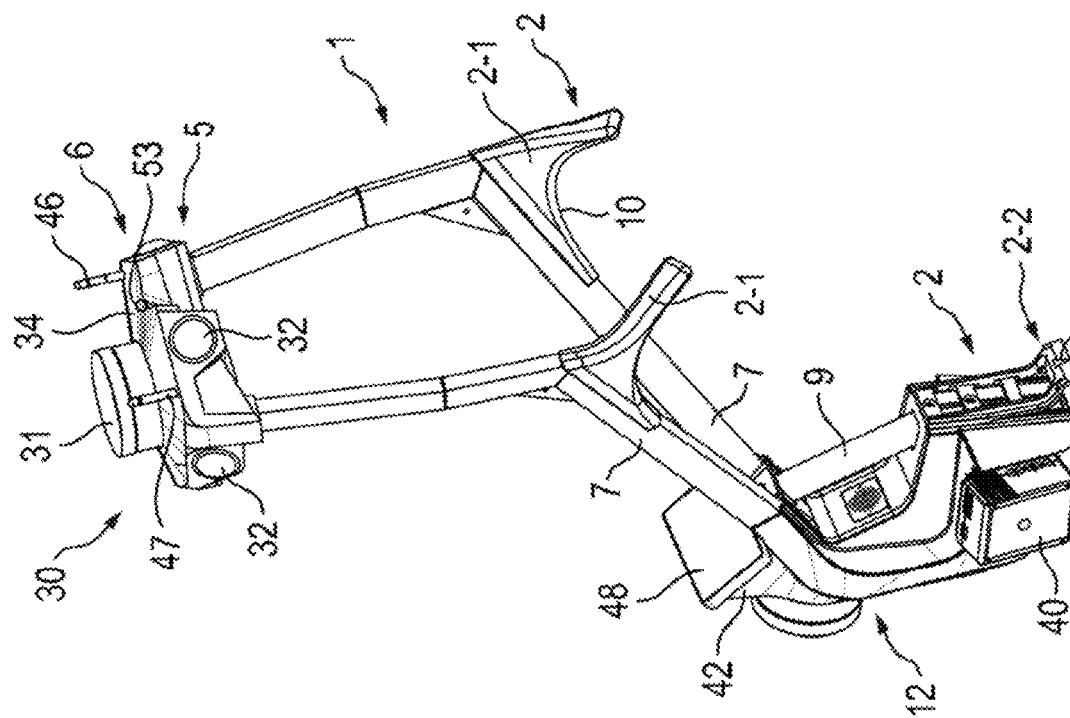
FIGS. 1A and 1B show perspective views of an embodiment example of the frame according to the disclosure and of the spatial detection device according to the disclosure.
Figure 1B:
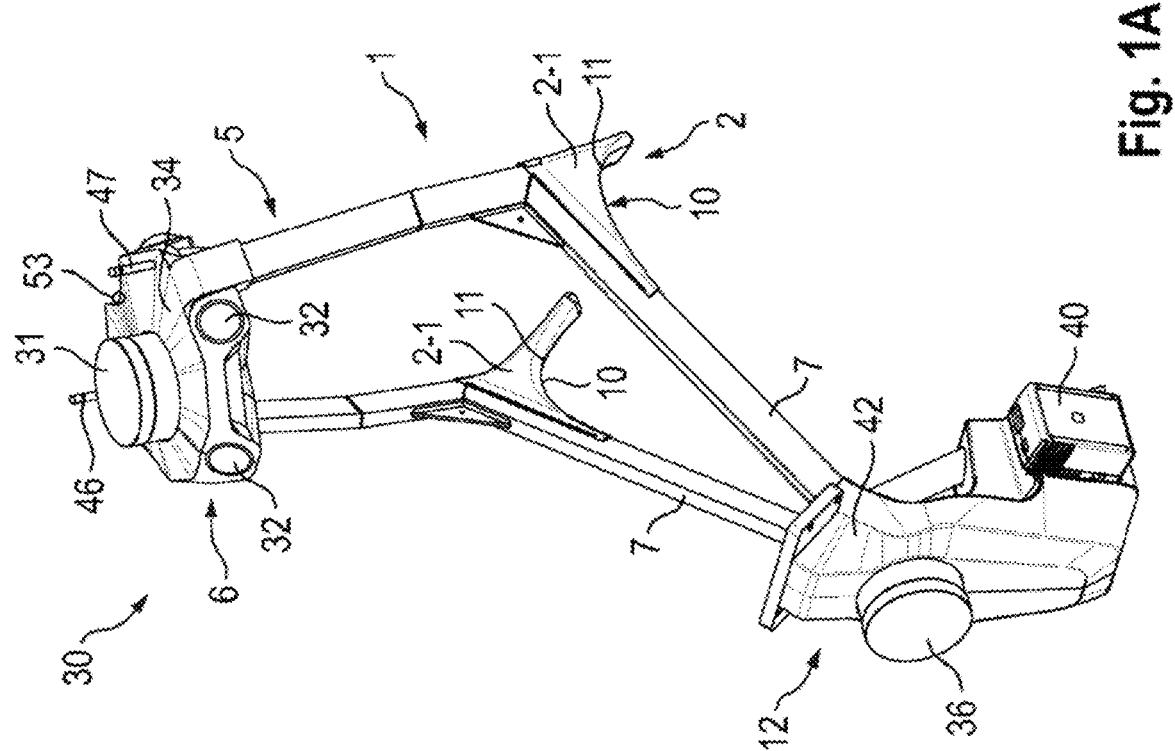

First, an embodiment example of the frame 1 according to the disclosure and an embodiment example of the spatial detection device 30 according to the disclosure, which comprises the frame 1 according to the disclosure, are explained, referring to FIGS. 1A and 1B:

The frame comprises a supporting device 2, by means of which a person can carry the frame 1 and the devices fastened to the frame 1. The supporting device 2 comprises two shoulder rests 2-1 and a contact part 2-2. The shoulder rests 2-1 are connected roughly in the middle of the frame 1 to a divided bracket 7. The bracket 7 connects the middle part of the frame 1, to which the shoulder rests 2-1 are fastened, via in each case a bracket 7 to the lower part of the frame 1, on which the contact part 2-2 is arranged. The contact part 2-2 is therefore connected via the bracket 7 to the shoulder rests 2-1. The contact part 2-2 is fastened to the bottom region of the frame 1, adjustable for height. It interacts with a hip rest 4 and optionally a hip strap 3, as will be explained later. From the shoulder rests 2-1, a divided upper frame section 5 extends to a head part of the frame 1.

The shoulder rests 2-1 have a curved segment 10. With vertical orientation of the frame 1, i.e. in an orientation wherein the frame 1 is being carried by a person, the curved segment 10 has an upper vertex 11. The curved segment 10 has a transition, on a side of the vertex 11, which points forwards with the frame 1 applied, into the bracket 7. With the frame 1 fitted, this part of the curved segment 10 is adjacent to the upper chest region of the carrying person. On the other side of the vertex 11, the curved segment goes backwards and downwards and, with the frame 1 fitted, is roughly adjacent to a part of the shoulder blade of the carrying person. In the vertical direction of the frame 1, which is also designated as the longitudinal direction of the frame 1, the distance from the rear end of the curved segment 10 to the vertex 11 is in a range of from 50 mm to 100 mm, in particular from 70 mm to 90 mm.

In the head region of the frame, a first holder 6 is arranged on the upper end of the upper frame section 5. A first multiple scanner 31 is fastened to this first holder 6. A multilevel laser scanner from the company Velodyne, type Puck LITE, is used as the first multiple scanner 31. The first multiple scanner 31 comprises several emission units. These emission units are made up of a plurality of lasers, which are integrated in one component, and which thus have a fixed orientation to one another. The lasers of the emission units produce a plurality of signal beams in directions of emission. The signal beams are oriented in such a way that they constitute an emission fan, which defines a plane. Details of the geometry and orientation of this emission fan will be explained later. The signal beams may for example impinge on an object, on the surface of which they are scattered or reflected. In this way, reflected radiation is produced. The backscattered or back-reflected part of this reflected radiation is detected by a receiver, which is integrated in the emission units.

In the present embodiment example, the emission units 16 comprise lasers, which emit signal pulses sequentially. For example, the individual lasers of the emission units emit signal pulses sequentially. The temporal spacing between these signal pulses is found from the transit time of a signal pulse to an object that is arranged at the maximum range of the first multiple scanner 31, where it is reflected and goes back to the receiver. When the receiver has detected this signal pulse, the signal pulse of the next laser is emitted. For example, there may be a time interval of 2.3 us between the signal pulses. In this time, light can cover a distance of 690 m, so that even at a maximum range of 100 m there is a sufficient interval between successive signal pulses. A signal pulse has for example a length of 6 ns.

The first multiple scanner 31 further comprises a scanning device. This scanning device varies the directions of emission of the signal beams. The directions of emission of the signal beams are rotated about a rotation axis. This rotation axis lies in the plane formed by the emission fan of the signal beams. Furthermore, the rotation axis is perpendicular to a central axis of the emission fan of the signal beams. This central axis may in particular be an axis of symmetry of the emission fan of the signal beams. Thus, the solid of revolution of a fan is detected by the first multiple scanner 31.

The frame 1 further comprises a second holder 12 in the lower region of the frame 1 at the bottom end of the bracket 7. A second multiple scanner 36 is fastened to the second holder 12. The second multiple scanner 36 is, like the bracket 7, arranged in front of the person 49 carrying the spatial detection device 30. As with the first multiple scanner 31, it is a multilevel laser scanner, which has the same construction as the first multiple scanner 31. The second multiple scanner 36 is, however, oriented differently than the first multiple scanner 31. It is oriented substantially vertically, i.e. the central axis of its emission fan is oriented substantially vertically, as will be explained later.

Furthermore, the spatial detection device 30 has several cameras 32, which can record digital images of the environment. In the embodiment example described, five cameras from the company FLIR with wide-angle objectives from the company Sunex are arranged on a circular ring on the first holder 6. When a person is carrying the spatial detection device 30, the circular ring is oriented substantially horizontally. The cameras 32 are positioned on the circular ring at equal angular spacing from one another on a regular pentagon. In addition, an inertial measurement unit 34 and two receiving antennas 46 and 47, whose function will be explained later, are fastened to the first holder 6.

In a variant of the embodiment example, the frame 1 may comprise a bumper. This surrounds in particular the first multiple scanner 31, the cameras 32, the receiving antennas 46, 47 and the inertial measurement unit 34, to protect them against impacts.

In addition, an evaluator 42, a display 48 and an energy supply 40, which is configured as a rechargeable battery, are fastened to the second holder 12 in the lower region of the frame 1. Moreover, a handle 9, on which the person carrying the spatial detection device 30 can hold the latter firmly in the lower region, extends between the bracket 7 in the direction of the contact part 2-2.

Referring to FIG. 2A, it will be explained how the frame of the spatial detection device 30 can be fitted on a person 49 and carried. In the illustration in FIG. 2A, the first holder 6 is shown without a cover, as is shown in FIGS. 1A and 1B.

The frame 1 is configured in such a way that when carrying the frame 1, the bracket 7 is arranged in front of the person 49, when the latter is carrying the frame 1 by means of the supporting device 2. The person 49 is, however, able to look through between the two-part bracket 7. When the frame 1 is carried by a person standing upright, the spatial detection device 30 is by definition oriented in the vertical direction V. The curved segments 10 of the shoulder rests 2-1 then rest on the shoulders 50 of the person 49. In this way, some of the weight of the spatial detection device 30 is carried by the shoulders 50 of the person 49. Moreover, as the curved segments 10 of the shoulder rests 2-1 surround the shoulders 50 backwards and downwards in a limited region, the shoulder rests 2-1 prevent the spatial detection device 30 tilting forward about the contact part 2-2 resting on the hip rest 4.

The contact part 2-2 is located at the level of the hip region 51 of the person 49, when the person 49 is carrying the frame by means of the supporting device 2. In this case the shoulder rests 2-1 rest on the shoulders 50 of the person 49.

Figure 4:
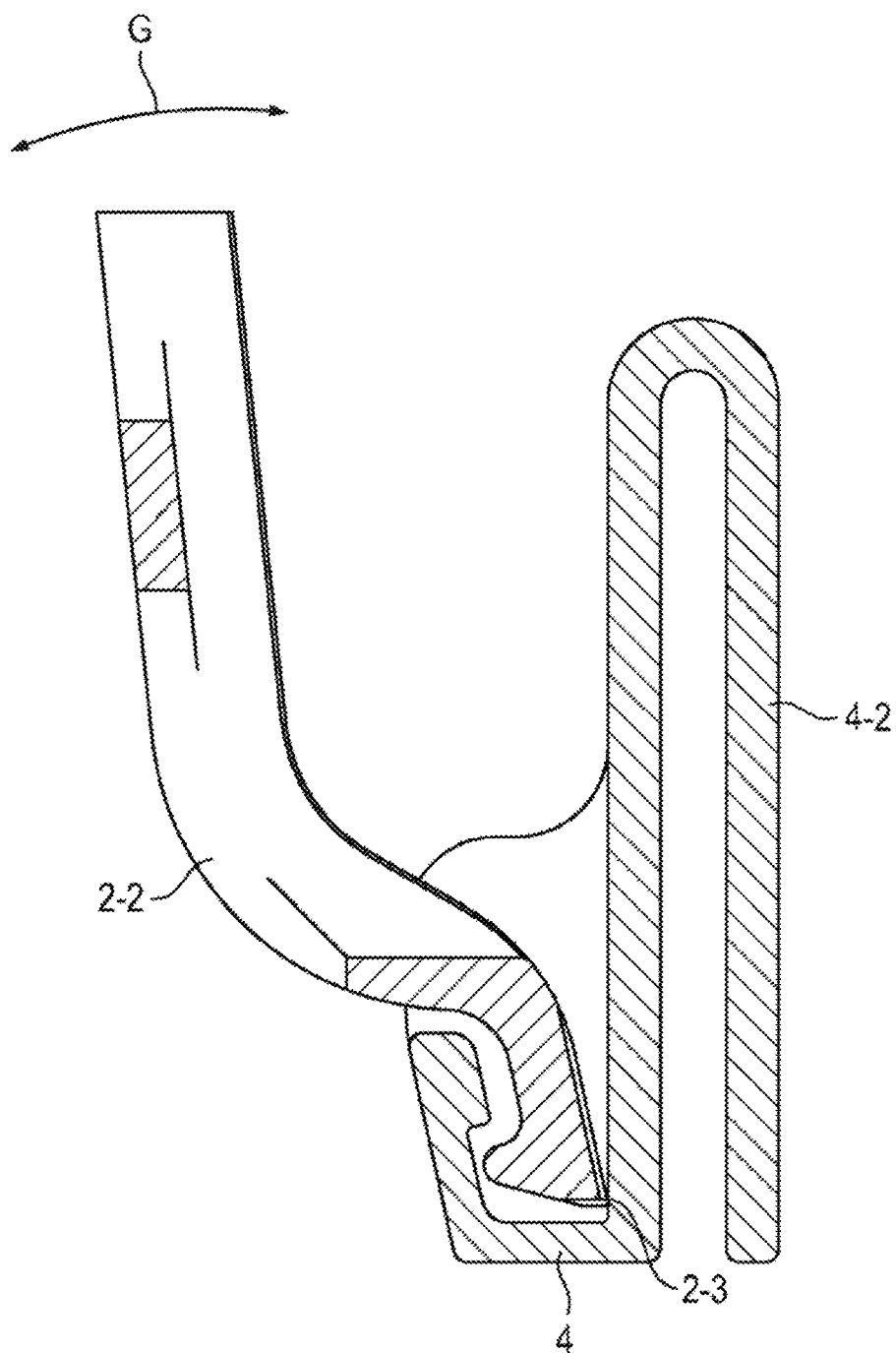
FIG. 4 shows a cross section of the connection of the hip rest to the contact part of the embodiment example of the frame according to the disclosure and of the spatial detection device according to the disclosure.

The lower region of the spatial detection device 30 is shown in detail in FIG. 2B. In this region, the contact part 2-2 rests on the hip rest 4. The coupling of the contact part 2-2 with the hip rest 4 is shown in detail in the cross-sectional view in FIG. 4. The contact part 2-2 is configured plate-shaped, having two curves in the lower region, as shown in FIG. 4. The contact part 2-2 has a transverse edge 2-3 at the bottom, which is oriented perpendicularly to the direction of motion F of the person 49. The hip rest 4 is made U-shaped in the front part. In this region, the lower end of the contact part 2-2 can be inserted, so that the transverse edge 2-3 rests on the hip rest 4, and so can take the weight of the spatial detection device 30. The contact part 2-2 therefore corresponds to the hip rest 4. The contact part 2-2 is thus received by the U-shaped region of the hip rest 4, so that it can be tilted forward about a transverse axis Y about the oblong transverse edge 2-3 of the contact part 2-2 in the direction of the double-headed arrow G from the position shown in FIG. 2A. To make this swiveling movement possible, the person 49 lowers both shoulders 50 somewhat, so that the rear regions of the curved segments 10 of the shoulder rests 2-1 can be tilted forward past the shoulders 50.

In addition, the hip rest 4 has vertical cheeks 4-1. These impede swiveling of the contact part 2-2 resting on the hip rest 4 about an axis perpendicular to the transverse axis Y. Sideways tilting of the frame 1 as well as rotations of the frame 1 relative to the hip rest 4 about a vertical axis are therefore prevented.

In an alternative embodiment example, the hip rest 4 is coupled via a bottom hinge to the contact part 2-2 of the frame 1, wherein the frame 1 can be swiveled by the bottom hinge about the transverse axis Y.

The forward-tilted state of the spatial detection device 30 is shown in FIGS. 3A and 3B. Once again, the first holder 6 is shown without the cover, as shown in FIGS. 1A and 1B. In this tilted state, the weight of the spatial detection device 30 is taken completely by the hip rest 4. For this purpose the hip rest 4 can be fastened to a hip strap 3 by means of the strap receiver 4-2. Alternatively the strap receiver 4-2 may also be hooked into the belt of the person 49. In the untilted state of the spatial detection device 30, i.e. in the operating state of the spatial detection device 30, as shown in FIG. 2A, more than 50% of the weight of the spatial detection device 30 is carried by means of the hip rest 4-2. In the operating state, the spatial detection device 30 is carried by a person 49, as shown in FIG. 2A. The shoulder rests 2-1 in this case prevent, in particular, the spatial detection device 30 tilting forward. Therefore they serve in particular for stabilization. Furthermore, for stabilization, the spatial detection device 30 can also be held firmly by the handle 9 with the hands of the person 49.

If the person 49 carrying the spatial detection device 30 is standing on a horizontal plane H1, there is, in the vertical direction V, as shown in FIG. 2A, a distance C between the shoulder rests 2-1 or a shoulder rest 2-1 and the contact part 2-2. There is a distance D between the shoulder rests 2-1 or the shoulder rest 2-1 and the first holder 6, and a distance E between the first multiple scanner 31 and the cameras 32. The distance C is in a range of from 400 mm to 800 mm, in particular in a range of from 500 mm to 700 mm, and in the present embodiment example this distance is equal to 515 mm. The distance D is in a range of from 300 mm to 500 mm, in particular in a range of from 350 mm to 400 mm and in the present embodiment example is equal to 372 mm. The distance E is in a range of from 50 mm to 10 mm, in particular in a range of from 60 mm to 80 mm. In the present embodiment example it is equal to 72 mm. Moreover, the first multiple scanner 31 is arranged above the cameras 32. The bottom region of the first holder 6 is at such a distance from the vertices 11 of the shoulder rests 2-1 that the head 49 of the person carrying the spatial detection device 30 has an unobstructed field of view forwards. Moreover, the distance D is large enough for the person 49 to be able to wear a helmet on the head.

Figure 2D:
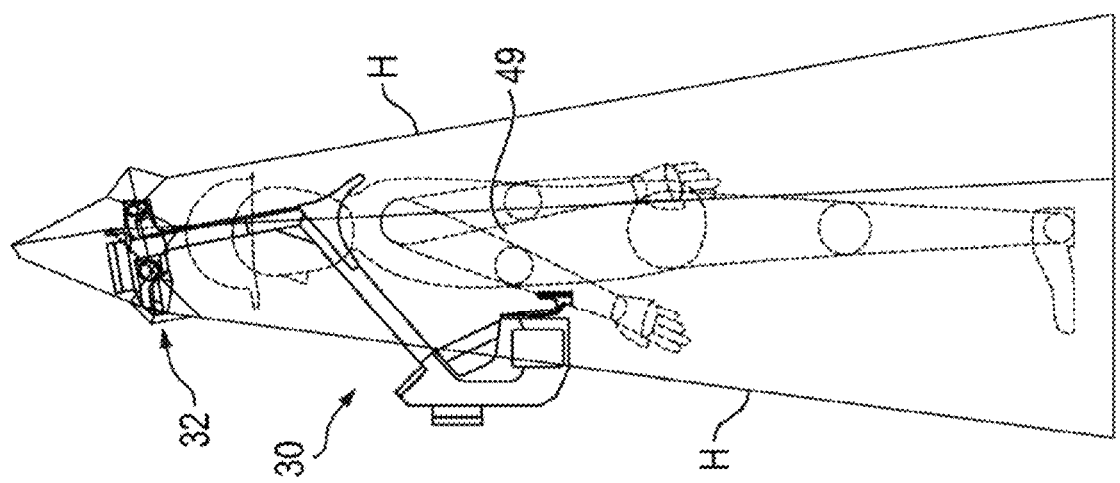
FIG. 2D shows the dead angle of the cameras, when a person is carrying the spatial detection device shown in FIGS. 1A and 1B.
Figure 2C:
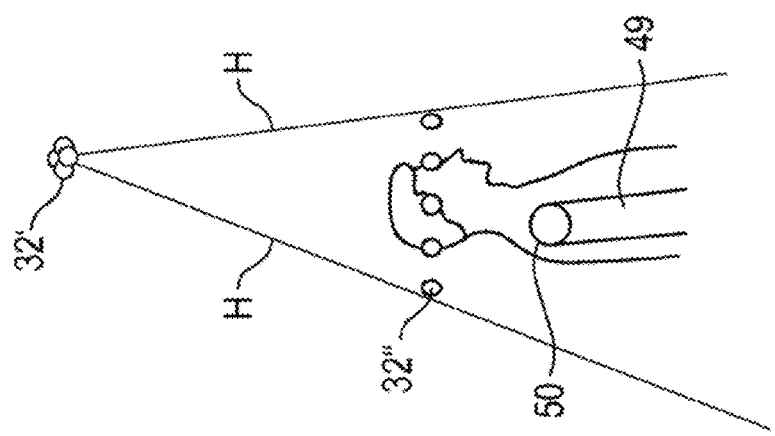
FIG. 2C illustrates the selection of the vertical position of the cameras, when a person is carrying a spatial detection device.

Through this arrangement of the cameras 32, a practicable compromise is found between two opposing requirements, as will be explained, referring to FIGS. 2C and 2D:

An arrangement of the cameras as high as possible, as designated in FIG. 2C with the reference symbol 32', would certainly make it possible to minimize the camera distance, so that so-called stitching artifacts would be minimized, whereas at the same time other parts of the head or of the shoulders 50 of the person 49 carrying the spatial detection device 30 would be visible in the captured images, owing to the larger distance, only in a smaller angular region, which is illustrated by the boundary lines H. This would lead to optimal all-round recording of the surrounding space with minimal stitching artifacts. With very high arrangement of the cameras 32', the spatial detection device would, however, extend far above the head of the person 49, so that the person would not be able to move in low spaces or through door openings, without tilting the spatial detection device 30 with the cameras 32' forwards. Moreover, the spatial detection device 30 could not in this case be carried so stably by the person 49. The deviations in movement of the person 49 at the height of the cameras 32' would also be very much larger. In addition, an excessively high recording height of the images would be disadvantageous, as the resultant panoramic view would not correspond to the natural viewing height of an observer.

The arrangement of the cameras 32 above the head is additionally advantageous compared to an arrangement at head height of the person 49, as designated in FIG. 2C with the reference symbol 32", because in this case undisturbed all-round recording is possible, and the field of view of the person 49 is not impaired. The dead angle that arises with the cameras 32" and is shown with the boundary line H can be minimized, while at the same time maintaining practicable use of the spatial detection device 30 when carried by a person 49.

FIG. 2D shows the arrangement of the cameras 32 in the embodiment example of the spatial detection device 30 according to the disclosure together with the boundary lines 50 that define the dead angle of the cameras 32. As shown, the person 49 is located within this dead angle.

As shown in FIG. 1B, the spatial detection device 30 further comprises for the contact part 2-2 a reference mark 54 in the form of a notch. It serves for detecting the position and/or orientation of the spatial detection device 30 relative to a stationary coordinate system with corresponding reference marks (ground control points), which in their turn are applied at defined points of the environment to be captured, for example as stickers on floors or walls of a building to be scanned, which are provided with cross hairs and a unique designation or identification number. While a scanning operation is in progress, the spatial detection device 30 is for example held briefly with the arrowhead of its reference mark 54 exactly on the cross hairs of a said ground control point and the time point and the unique designation or identification number of the ground control point are captured. The exact time point is captured by actuating a separate actuating button 53, which is pressed as soon as the arrowhead and cross hairs marking make contact.

Figure 5:
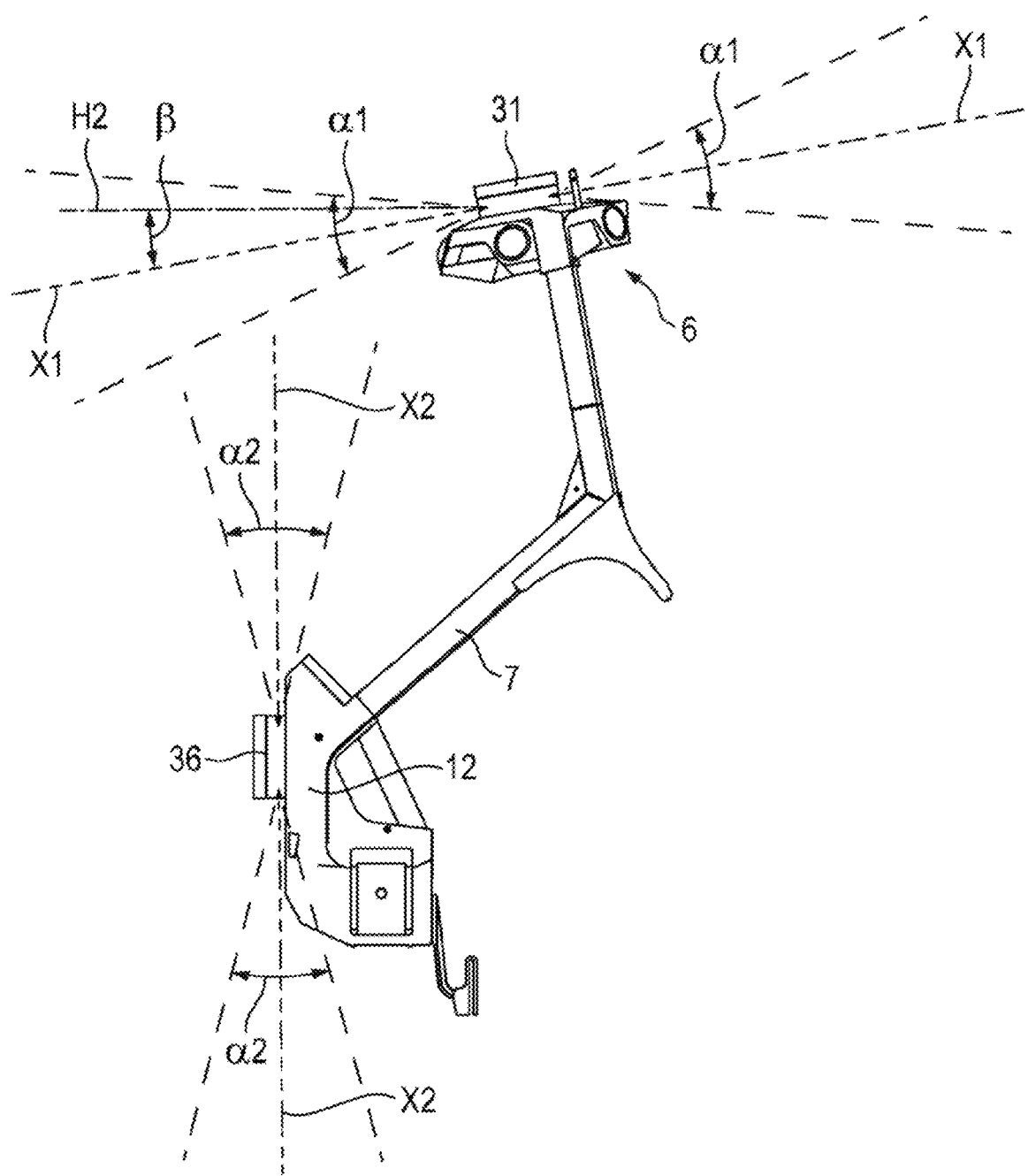
FIG. 5 shows the orientation of the scanning devices of the spatial detection device according to the disclosure.

The orientations of the first multiple scanner 31 and of the second multiple scanner 36 in the operating state of the spatial detection device 30 are explained below, referring to FIG. 5:

The first multiple scanner 31 is fastened to the first holder 6 in such a way that the central axis X1 of its emission fan makes an angle $\beta$ with the horizontal plane H2. The angle $\beta$ is in a range of from 5° to 20°. In the present embodiment example the angle $\beta$ is equal to 10°. The first multiple scanner 31 is therefore inclined forwards by 10°. The emission fan has an aperture angle $\alpha 1$. This aperture angle is in a range of from 10° to 40°. In the present embodiment example the angle $\alpha 1$ is 30°.

The second multiple scanner 36 is fastened to the second holder 12 in such a way that its central axis X2 is oriented vertically. The aperture angle $\alpha 2$ of the emission fan of the second multiple scanner 36 corresponds to the aperture angle $\alpha 1$ of the emission fan of the multiple scanner 31. The person 49 carrying the spatial detection device 30 is therefore outside of the emission fan of the multiple scanners 31, 36.

Figure 6:
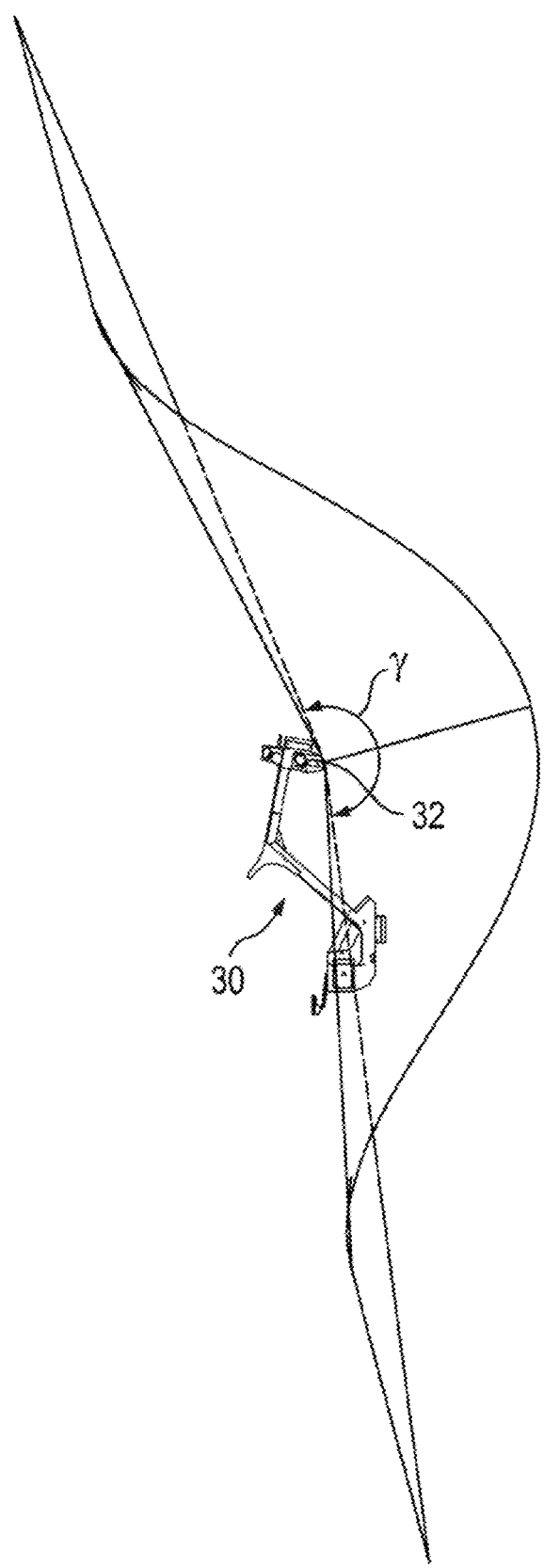
FIG. 6 shows the taking angle of the cameras of the spatial detection device according to the disclosure.

The taking angle of the cameras 32 is explained below, referring to FIG. 6.

The aperture angle of each camera 32 is not a rotationally symmetric cone. Instead, the aperture angle is different in different directions. In a vertical section through the spatial detection device 30, as shown in FIG. 6, a vertical aperture angle $\gamma$ is formed. This is in a range of from 170° to 210°. In the present embodiment example this aperture angle $\gamma$ is greater than 180°, namely 195. The vertical aperture angle $\gamma$ is then oriented in such a way that the person 49, when carrying the spatial detection device 30, is mainly located outside the taking angle of the cameras 32. Moreover, the horizontal distance of the cameras 32 is selected as small as possible, so that the region captured by the cameras 32 in the immediate environment of the person 49 is as large as possible. By means of the camera 32 arranged on the circular ring, in particular the object space surrounding the person 49 can be captured completely, while only the person 49 is left out of the photographs of the cameras 32.

The placement of the spatial detection device 30 on a horizontal plane H3 is explained below, referring to FIG. 7:

For the frame 1, set-down points 37 are defined, on which the spatial detection device 30 can rest freely on the horizontal plane H3 in such a way that the first multiple scanner 31, the second multiple scanner 36 and the cameras 32 do not come into contact with the horizontal plane H3. In the embodiment example described, three set-down points 37 are formed, namely on the rear edges of the shoulder rests 2-1 and on the contact part 2-2.

Figure 7:
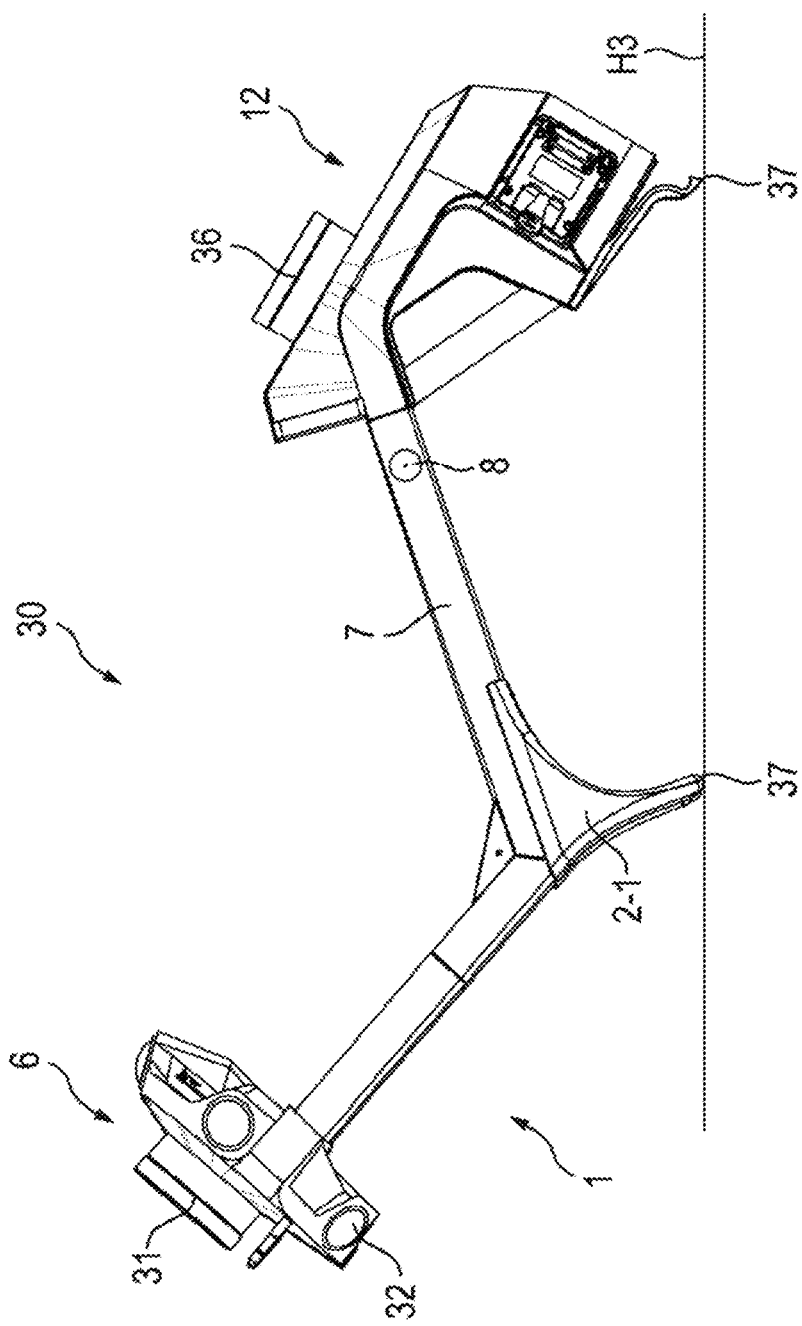
FIG. 7 shows the spatial detection device according to the disclosure placed on a horizontal plane and FIG. 8 shows the data-technology structure of the embodiment example of the spatial detection device according to the disclosure.

So as to be able to transport the spatial detection device 30 with a smaller pack size, the frame 1 has, in a modified embodiment example shown in FIG. 7, a central hinge 8 in the bracket 7. This central hinge 8 makes it possible to swivel the head region of the spatial detection device 30 in the direction of the lower region, in order to reduce the pack size of the spatial detection device 30. The central hinge 8 has two locking positions: One locking position for the folded-up frame 1 and another locking position for the frame 1 in the operating state, as shown in FIG. 7.

In an alternative embodiment example, the frame 1 can be dismantled and reassembled, for example at the bracket 7.

Figure 8:
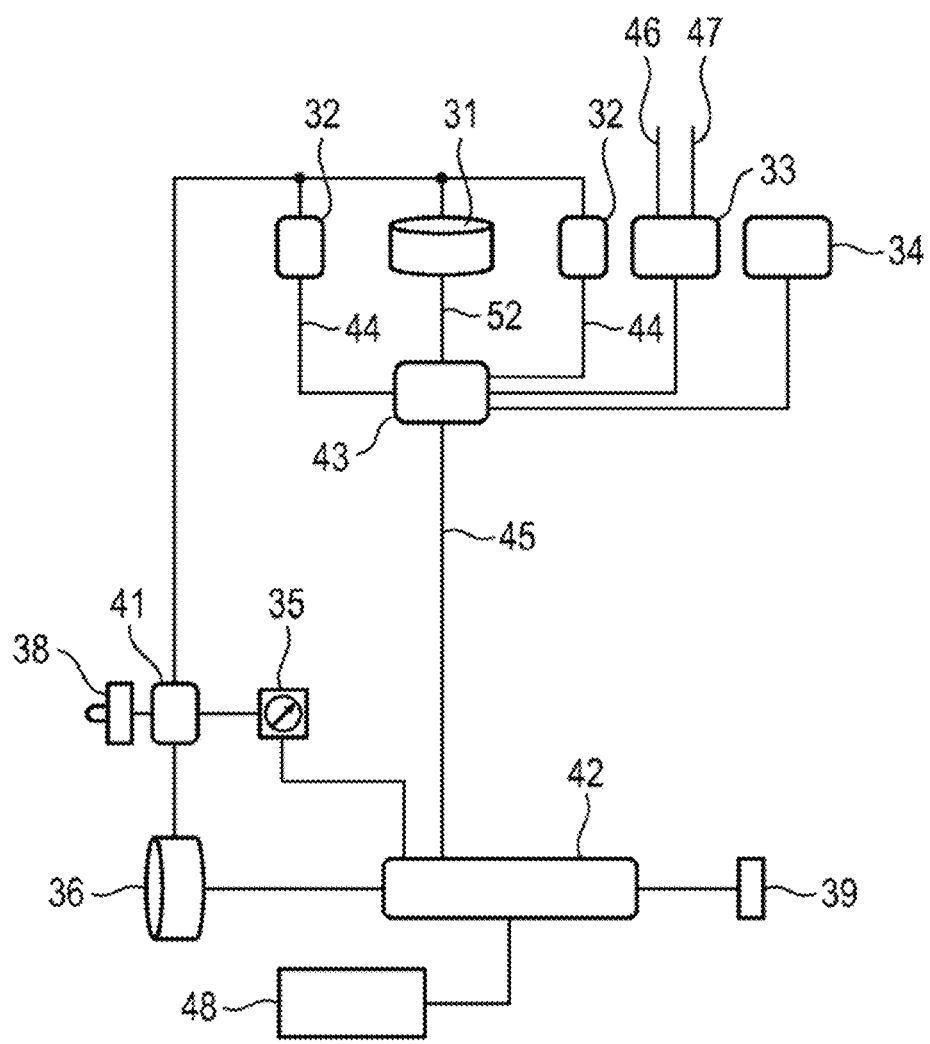

The data-technology structure of the embodiment example of the spatial detection device according to the disclosure is explained referring to FIG. 8. How the individual components of the spatial detection device 30 interact in the data technology respect and electronically is described.

The cameras 32 are connected to a control device 41. The control device 41 is in its turn connected to a trigger 38, which is arranged in the vicinity of the handle 9 of the spatial detection device 30 in such a way that the person 49 can actuate the trigger 38 with the finger. If the person 49 actuates the trigger 38, the control device 41 activates simultaneous image recording by means of the cameras 32. The control device 41 is also coupled to a timer 35, so that the time point of activation of the cameras 32 can be stored together with the image recordings of the cameras 32. For this purpose the timer 35 is also connected to the evaluator 42.

The cameras 32 arranged in the head region of the spatial detection device 30 at the first holder 6 are connected via USB cable 44, the multiple scanner 31 via an Ethernet cable 52 to a grouping and synchronizing interface 43, which is also arranged in the head region of the spatial detection device 30 at the first holder 6. Via this USB cable 44 and the Ethernet cable 52, the cameras 32 and the first multiple scanner 31 transfer the recorded data, including the time point and the angular position of the scanning device of the multiple scanner 31 and the intensity of each signal pulse emitted and received, to the grouping and synchronizing interface 43. The grouping and synchronizing interface 43 converts the received data and links it to the time stamps it produces, so that it can be transmitted further via a collective data transfer cable 45, which is laid in the tubes of the frame 1, to the evaluator 42, which is fastened to the second holder 12 in the lower region of the spatial detection device 30.

Moreover, the first receiving antenna 46 for a signal of a wireless network (WLAN/WiFi) and the second antenna 47 for receiving a wireless Bluetooth signal are arranged on the first holder 6. The signals received by the two receiving antennas 46, 47 are transferred to a signal processing unit 33, which is also arranged on the first holder 6, and which transfers the data further to the evaluator 42 or alternatively, as shown in FIG. 8, to the grouping and synchronizing interface 43 for further processing.

Finally, an inertial measurement unit 34 is arranged on the first holder 6, for detecting accelerations in the three directions in space and rotation rates about three space axes, so that the orientation or change in orientation of the spatial detection device 30 in the space can be determined. The data captured by the inertial measurement unit 34 are transferred to the evaluator 42 or alternatively, as shown in FIG. 8, to the grouping and synchronizing interface 43 for further processing.

In addition, a state sensor is provided by the inertial measurement unit 34 or by a software-based evaluation module in the evaluator 42, which evaluates the data of the inertial measurement unit 34, or by other sensors, in particular pressure sensors. This is able to detect how the frame 1 is carried by a person 49. The state sensor can in particular detect whether the frame 1 is carried at least partly by the shoulder rest 2-1, as shown in FIG. 2A, or whether the frame 1 has been swiveled forwards by means of the contact part 2-2 and the hip rest 4, and therefore is arranged tilted in such a way that it is no longer resting on the shoulders 50 of the person 49, as shown in FIG. 3A, or whether it has been brought to a position set down and at rest, as shown in FIG. 7.

By means of the data that the evaluator 42 receives, the latter is able to calculate the direction and the distance of an object in the object space, which has been detected by means of the various scanning devices of the spatial detection device 30. In addition, further features of the surface of the detected objects may optionally be determined.

A three-dimensional point cloud, which reproduces the captured object space, is produced by the evaluator 42 in real time. In the real-time calculation, at least the reflected radiation detected by the receivers of the multiple scanners 31, 36 is used for this. Moreover, the images taken by the cameras 32 may also be used in the real-time processing and production of the three-dimensional point cloud. In this way, the evaluator 42 calculates in real-time a graphical representation of the regions of the object space, through which the detection device 30 can be moved and/or has been moved. This graphical representation is output by the display 48. It is updated continuously during acquisition of the object space.

The evaluator 42 is coupled to a data interface 39. Via this data interface 39, the data collected by the evaluator 42 including the data already produced during operation of the spatial detection device 30 are transferred to a memory for temporary storage. Alternatively or additionally, the data may also be transferred to an external data storage unit during operation of the spatial detection device or after conclusion of a detection operation. These data may then be used for postprocessing. A more accurate point cloud of the captured object space is produced in this postprocessing. The volume of computation in the postprocessing is so great that it cannot be carried out in real time by the evaluator 42.

LIST OF REFERENCE NUMERALS 1 frame
2 supporting device
2-1 shoulder rests
2-2 contact part
2-3 transverse edge of the contact part
3 hip strap
4 hip rest
4-1 vertical cheeks of the hip rest
4-2 strap receiver
5 upper frame section
6 first holder
7 bracket
8 central hinge
9 handle
10 curved segment
11 vertex
12 second holder
30 spatial detection device
31 first multiple scanner
32 cameras
33 signal processing unit
34 inertial measurement unit
35 timer
36 second multiple scanner
37 set-down points
38 trigger 39 wired data interface
40 energy supply
41 control device
42 data processing device
43 grouping and synchronizing interface
44 USB cable
45 collective data transfer cable
46 first receiving antenna
47 second receiving antenna
48 display
49 person
50 shoulders
51 hip
52 Ethernet cable
53 actuating button
54 reference mark

The invention claimed is:

1. A frame for at least one scanning device for carrying the at least one scanning device by means of a person, the frame comprising:
   a supporting device for fitting and carrying the frame by the person, and
   an upper frame section, to which a first holder for the at least one scanning device is fastened,
   wherein the supporting device further comprises a contact part, wherein the contact part is located proximate a level of a hip region of the person, when the person is carrying the frame by means of the supporting device,
   wherein the supporting device further comprises a hip rest which corresponds to the contact part,
   wherein the hip rest interacts with the contact part such that the contact part swivels about a first axis.

2. The frame of claim 1, wherein a bracket is arranged in front of the person, when the person is carrying the frame by means of the supporting device.

3. The frame of claim 1, wherein the frame has a central hinge for folding up the frame.

4. The frame of claim 3, wherein the central hinge has at least two locking positions, one locking position for a folded-up state of the frame and another locking position for an operating state of the frame.

5. The frame of claim 1, wherein when the contact part swivels about the first axis and when the contact part is resting on the hip rest, swiveling about an axis perpendicular to the first axis is blocked.

6. The frame of claim 5, wherein the contact part has an oblong transverse edge, with which the contact part rests on the hip rest and the first axis is oriented parallel to the oblong transverse edge of the contact part.

7. The frame of claim 5, wherein the hip rest has vertical cheeks which block swiveling of the contact part resting on the hip rest about an axis perpendicular to the first axis.

8. The frame of claim 1, wherein the hip rest is coupled via a bottom hinge to the contact part of the frame, wherein the frame swivels via the bottom hinge about the first axis.

9. The frame of claim 2, wherein at least one of the bracket and the contact part is adjustable for height of the person.

10. The frame of claim 2, wherein on the bracket a second holder is arranged, on which an additional scanning device can be fastened, wherein the second holder is arranged in front of the person, when the person is carrying the frame by means of the supporting device.

11. A spatial detection device with at least one scanning device and the frame of claim 1.

12. The spatial detection device of claim 11, further comprising at least one camera fastened to the first holder of the frame above the head of the person, when the person is carrying the spatial detection device using the frame.

13. The spatial detection device of claim 12, wherein the at least one camera comprises a plurality of cameras arranged spaced apart on a ring, wherein the ring is oriented substantially horizontally, when the person is carrying the spatial detection device by means of the frame.

14. The spatial detection device of claim 11, wherein on the first holder of the frame at least one of a receiving antenna and an inertial measurement unit is fastened above the head of the person, when the person is carrying the spatial detection device by means of the frame.

15. The spatial detection device of claim 14, wherein the frame comprises a bumper and the at least one camera, the receiving antenna, and an inertial measurement unit are surrounded by the bumper.

16. The spatial detection device of claim 11, further comprising at least one state sensor, which is configured to detect how the frame is being carried by the person.

17. The spatial detection device of claim 11, wherein the spatial detection device has at least one reference mark for capturing at least one of a position and an orientation of the spatial detection device relative to a stationary coordinate system.

* * * * *